US012652394B2

(12) United States Patent
Deng et al.

(10) Patent No.: US 12,652,394 B2
(45) Date of Patent: Jun. 9, 2026

(54) METHOD, DEVICE, AND MEDIUM FOR VIDEO PROCESSING

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, Los Angeles, CA (US); Kai Zhang, Los Angeles, CA (US); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 107 days.

(21) Appl. No.: 18/286,211

(22) PCT Filed: Apr. 8, 2022

(86) PCT No.: PCT/CN2022/085947
§ 371 (c)(1),
(2) Date: Oct. 9, 2023

(87) PCT Pub. No.: WO2022/214092
PCT Pub. Date: Oct. 13, 2022

(65) Prior Publication Data
US 2024/0205414 A1      Jun. 20, 2024

(30) Foreign Application Priority Data
Apr. 9, 2021    (WO) ................ PCT/CN2021/086212

(51) Int. Cl.
| H04N 19/139 | (2014.01) |
| H04N 19/119 | (2014.01) |
| H04N 19/176 | (2014.01) |
| H04N 19/70 | (2014.01) |

(52) U.S. Cl.
CPC ......... *H04N 19/139* (2014.11); *H04N 19/119* (2014.11); *H04N 19/176* (2014.11); *H04N 19/70* (2014.11)

(58) Field of Classification Search
CPC ...... H04N 19/109; H04N 19/70; H04N 19/52; H04N 19/176; H04N 19/139; H04N 19/119
See application file for complete search history.

(56) References Cited

U.S. PATENT DOCUMENTS

| 2020/0014948 A1* | 1/2020 | Lai ...................... H04N 19/436 |
| 2020/0177873 A1* | 6/2020 | Li ........................ H04N 19/103 |
(Continued)

FOREIGN PATENT DOCUMENTS

| WO | 2020088689 A1 | 5/2020 |
| WO | 2020244568 A1 | 12/2020 |
| WO | 2020256422 A1 | 12/2020 |

OTHER PUBLICATIONS

International Search Report and Written Opinion for International Application No. PCT/CN2022/085947, mailed Jun. 23, 2022 (9 pages).
(Continued)

*Primary Examiner* — Neil R Mikeska
(74) *Attorney, Agent, or Firm* — Astute IP Law Group

(57) ABSTRACT
Embodiments of the present disclosure provide a solution for video processing. A method for video processing is proposed. The method comprises: determining, during a conversion between a target block in a target picture of a video and a bitstream of the video, first motion information of the target block based on a regular merge mode, the first motion information comprising a regular merge list of regular merge candidates for the target block; determining second motion information from the first motion information based on a geometric partitioning-based merge mode
(Continued)

and a redundancy check, the second motion information comprising a geometric partitioning-based merge list of geometric partitioning-based merge candidates for the target block; and performing the conversion based on the first motion information and the second motion information. Compared with the conventional solution, the proposed method can advantageously improve the coding efficiency and compression ratios.

21 Claims, 12 Drawing Sheets

(56) References Cited

U.S. PATENT DOCUMENTS

| | | | | |
|---|---|---|---|---|
| 2020/0213622 | A1* | 7/2020 | Xu | H04N 19/44 |
| 2020/0236384 | A1* | 7/2020 | Xu | H04N 19/107 |
| 2020/0267406 | A1* | 8/2020 | Chang | H04N 19/52 |
| 2020/0336736 | A1* | 10/2020 | Li | H04N 19/109 |
| 2020/0336755 | A1* | 10/2020 | Lai | H04N 19/46 |
| 2020/0389651 | A1* | 12/2020 | Reuze | H04N 19/176 |
| 2021/0092357 | A1* | 3/2021 | Wang | H04N 19/577 |

OTHER PUBLICATIONS

Ma et al. "GPM merge list construction modification, JVET-R0368-v2" Joint Video Experts Team (JVET) of ITU-T SG 16 WP 3 and ISO/IEC JTC 1/SC 29/WG 11 18th Meeting: by teleconference, Apr. 15-24, 2020, Apr. 17, 2020 (Apr. 17, 2020), sections 1-3.
Zhang et al. "Geometric prediction mode with motion vector differences, JVET-R0357" Joint Video Experts Team (JVET) of ITU-T SG 16 WP 3 and ISO/IEC JTC 1/SC 29/WG 11 18th Meeting: by teleconference, Apr. 15-24, 2020, Apr. 9, 2020 (Apr. 9, 2020), sections 1-2.

* cited by examiner

ENCODED
BITSTREAM

ENTROPY
DECODING
UNIT 301

MOTION
COMPENSATI
ON UNIT 302

INTRA
PREDICATION
UNIT 303

306

BUFFER 307

DECODED
VIDEO DATA

INVERSE
QUANTIZATIO
N UNIT 304

INVERSE
TRANSFORM
UNIT 305

300

L0 reference
L1 reference
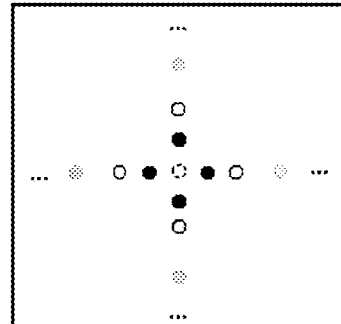
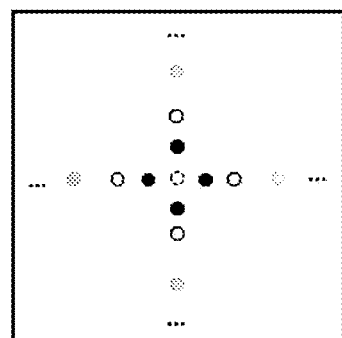
Fig. 8
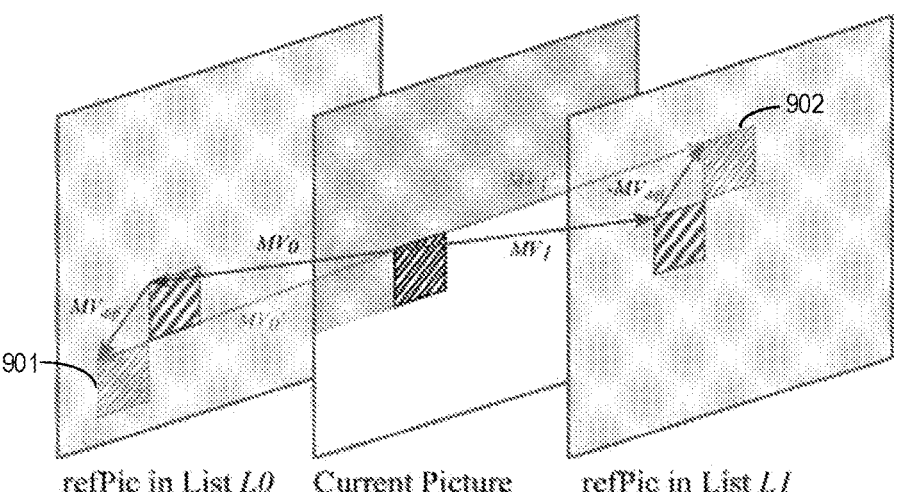
refPic in List *L0*    Current Picture    refPic in List *L1*
Fig. 9
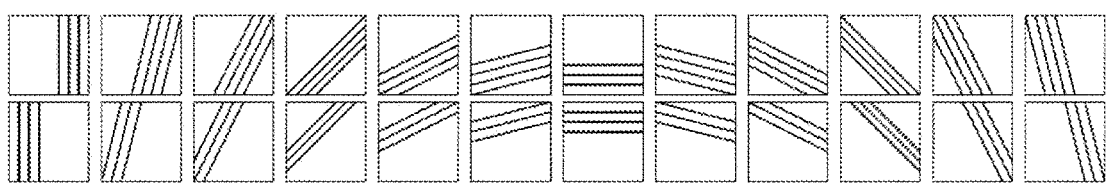
Fig. 10

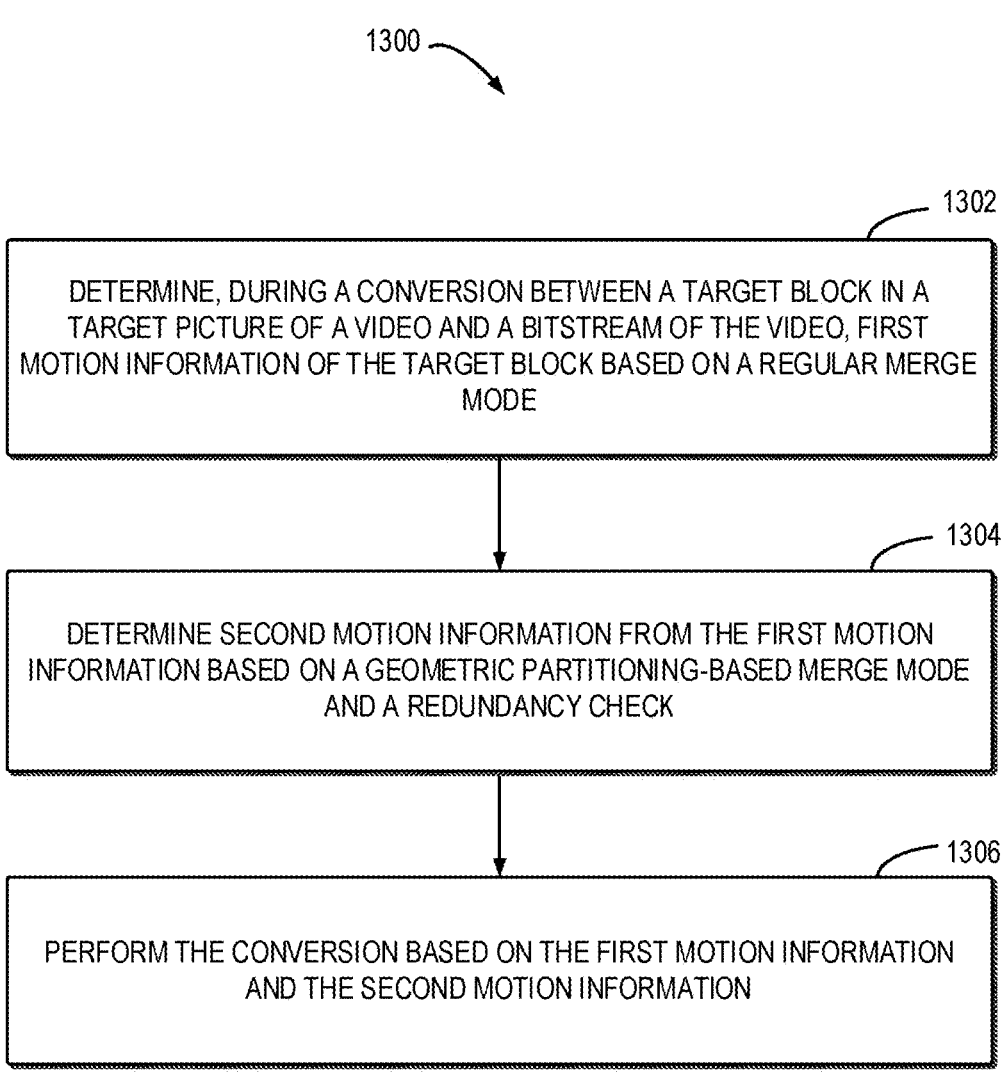

1300

1302

DETERMINE, DURING A CONVERSION BETWEEN A TARGET BLOCK IN A TARGET PICTURE OF A VIDEO AND A BITSTREAM OF THE VIDEO, FIRST MOTION INFORMATION OF THE TARGET BLOCK BASED ON A REGULAR MERGE MODE

1304

DETERMINE SECOND MOTION INFORMATION FROM THE FIRST MOTION INFORMATION BASED ON A GEOMETRIC PARTITIONING-BASED MERGE MODE AND A REDUNDANCY CHECK

1306

PERFORM THE CONVERSION BASED ON THE FIRST MOTION INFORMATION AND THE SECOND MOTION INFORMATION

Fig. 13

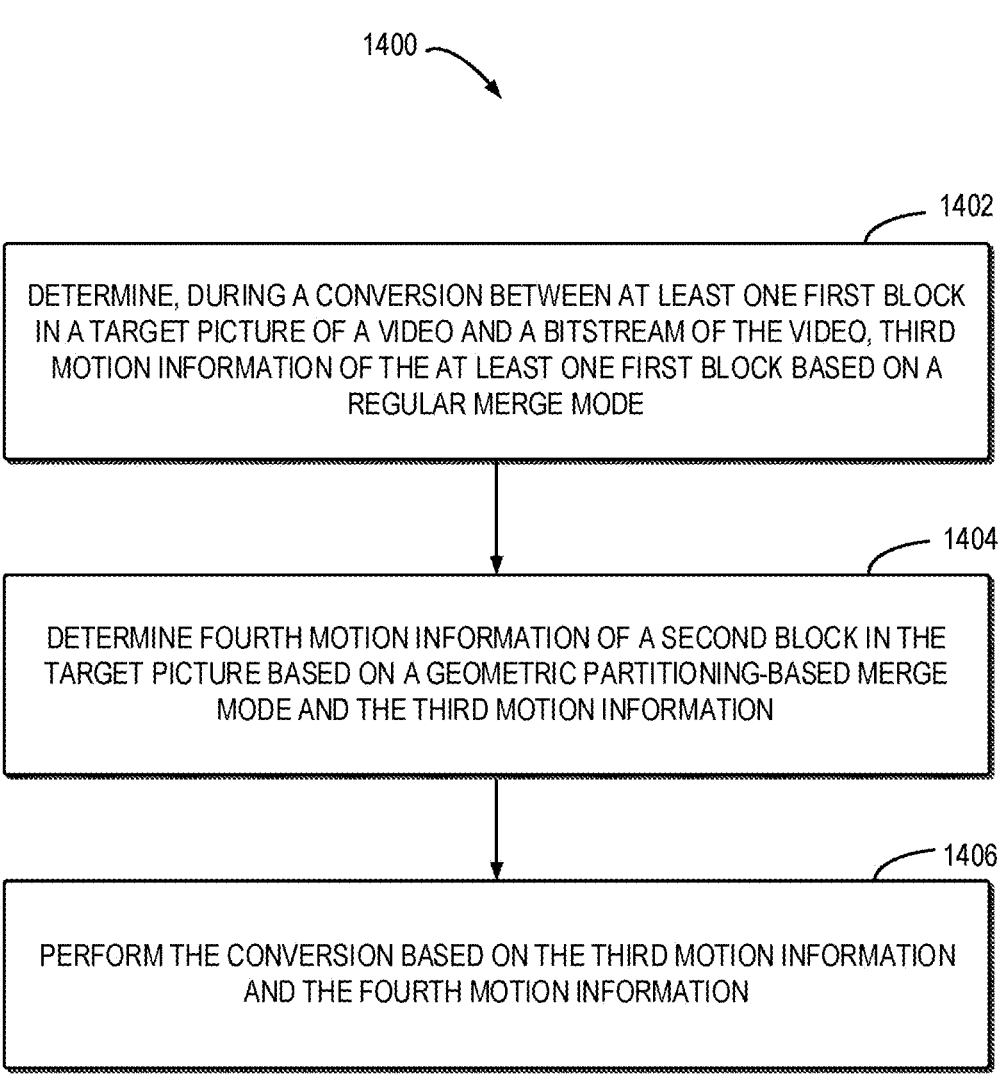

1400

1402

DETERMINE, DURING A CONVERSION BETWEEN AT LEAST ONE FIRST BLOCK IN A TARGET PICTURE OF A VIDEO AND A BITSTREAM OF THE VIDEO, THIRD MOTION INFORMATION OF THE AT LEAST ONE FIRST BLOCK BASED ON A REGULAR MERGE MODE

1404

DETERMINE FOURTH MOTION INFORMATION OF A SECOND BLOCK IN THE TARGET PICTURE BASED ON A GEOMETRIC PARTITIONING-BASED MERGE MODE AND THE THIRD MOTION INFORMATION

1406

PERFORM THE CONVERSION BASED ON THE THIRD MOTION INFORMATION AND THE FOURTH MOTION INFORMATION

Fig. 14

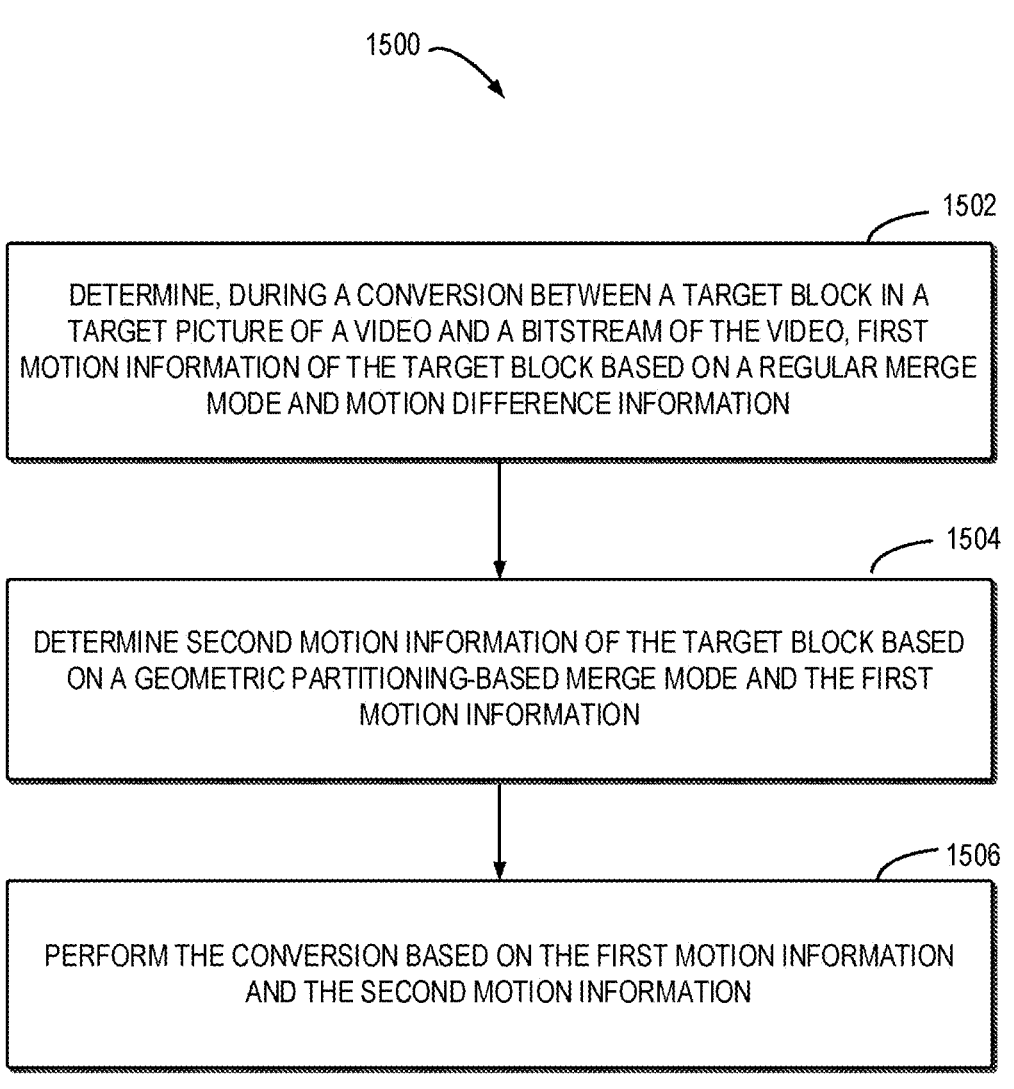

1500

1502

DETERMINE, DURING A CONVERSION BETWEEN A TARGET BLOCK IN A TARGET PICTURE OF A VIDEO AND A BITSTREAM OF THE VIDEO, FIRST MOTION INFORMATION OF THE TARGET BLOCK BASED ON A REGULAR MERGE MODE AND MOTION DIFFERENCE INFORMATION

1504

DETERMINE SECOND MOTION INFORMATION OF THE TARGET BLOCK BASED ON A GEOMETRIC PARTITIONING-BASED MERGE MODE AND THE FIRST MOTION INFORMATION

1506

PERFORM THE CONVERSION BASED ON THE FIRST MOTION INFORMATION AND THE SECOND MOTION INFORMATION

Fig. 15

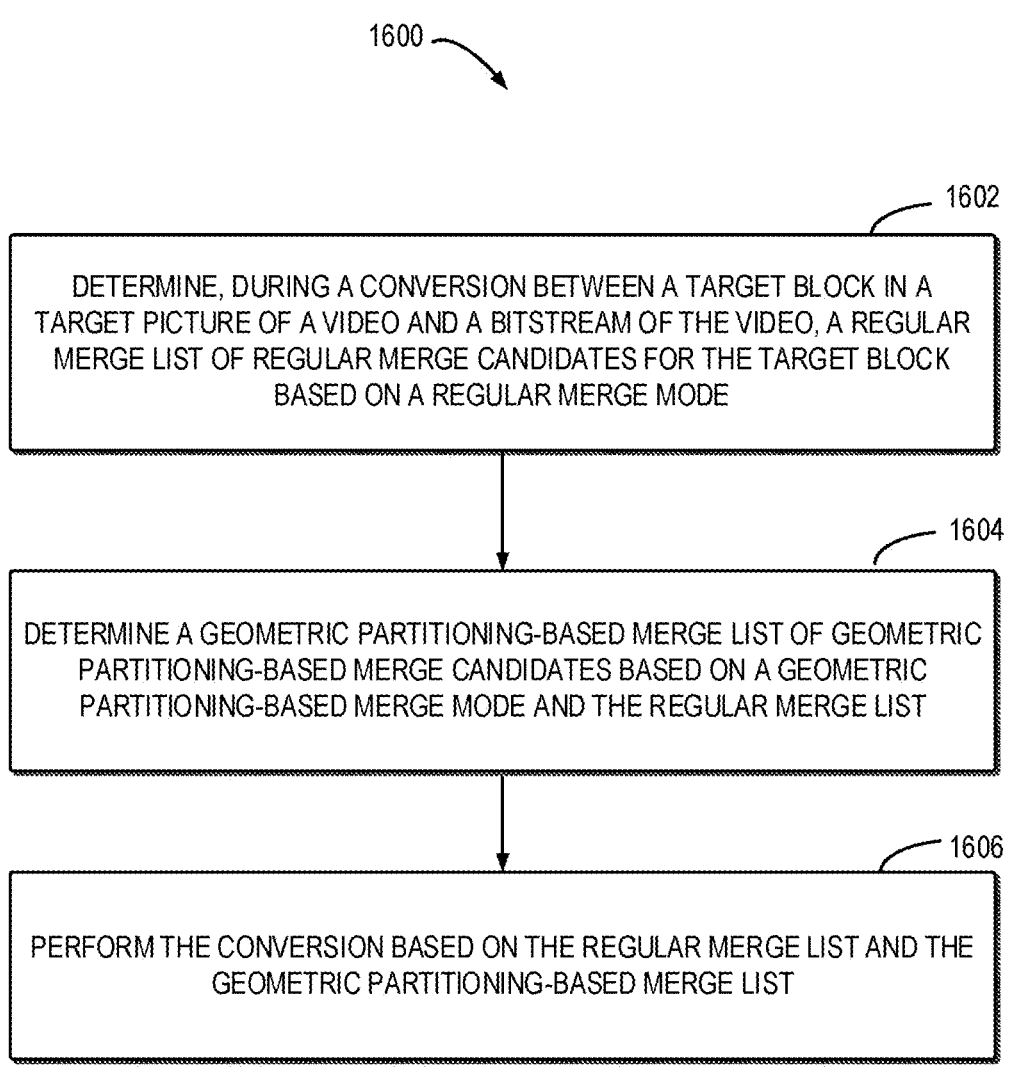

1600

1602

DETERMINE, DURING A CONVERSION BETWEEN A TARGET BLOCK IN A TARGET PICTURE OF A VIDEO AND A BITSTREAM OF THE VIDEO, A REGULAR MERGE LIST OF REGULAR MERGE CANDIDATES FOR THE TARGET BLOCK BASED ON A REGULAR MERGE MODE

1604

DETERMINE A GEOMETRIC PARTITIONING-BASED MERGE LIST OF GEOMETRIC PARTITIONING-BASED MERGE CANDIDATES BASED ON A GEOMETRIC PARTITIONING-BASED MERGE MODE AND THE REGULAR MERGE LIST

1606

PERFORM THE CONVERSION BASED ON THE REGULAR MERGE LIST AND THE GEOMETRIC PARTITIONING-BASED MERGE LIST

Fig. 16

METHOD, DEVICE, AND MEDIUM FOR VIDEO PROCESSING

CROSS-REFERENCE TO RELATED APPLICATIONS

This application is a 35 U.S.C. § 371 National Phase of PCT Application No. PCT/CN2022/085947, filed on Apr. 8, 2022, which claims priority to PCT Application No. PCT/CN2021/086212, filed on Apr. 9, 2021, the disclosures of which are hereby incorporated by reference herein in their entireties.

FIELD

Embodiments of the present disclosure relates generally to video coding techniques, and more particularly, to reference structure for video coding.

BACKGROUND

In nowadays, digital video capabilities are being applied in various aspects of peoples' lives. Multiple types of video compression technologies, such as MPEG-2, MPEG-4, ITU-TH.263. ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, during a conversion between a target block in a target picture of a video and a bitstream of the video, first motion information of the target block based on a regular merge mode, the first motion information comprising a regular merge list of regular merge candidates for the target block; determining second motion information from the first motion information based on a geometric partitioning-based merge mode and a redundancy check, the second motion information comprising a geometric partitioning-based merge list of geometric partitioning-based merge candidates for the target block; and performing the conversion based on the first motion information and the second motion information. Compared with the conventional solution, the proposed method can support the geometric partitioning mode (GPM) with motion vector differences (MVDs). Additionally, the proposed method can advantageously improve the coding efficiency and reduce the computational complexity by applying the pruning process during the geometric partitioning-based merge list construction.

In a second aspect, a method for video processing is proposed. The method comprises: determining, during a conversion between at least one first block in a target picture of a video and a bitstream of the video, third motion information of the at least one first block based on a regular merge mode; determining fourth motion information of a second block in the target picture based on a geometric partitioning-based merge mode and the third motion information, the at least one first block not spatially adjacent to the second block in the target picture; and performing the conversion based on the third motion information and the fourth motion information. The method in accordance with the second aspect of the present disclosure employs motion information of neighbor blocks which are not spatially adjacent to the current block to derive motion information of a unit block coded by the geometric partitioning-based merge mode. Compared with the conventional solution, the proposed method can advantageously improve the coding efficiency.

In a third aspect, a method for video processing is proposed. The method comprises: determining, during a conversion between a target block in a target picture of a video and a bitstream of the video, first motion information of the target block based on a regular merge mode and motion difference information; determining second motion information of the target block based on a geometric partitioning-based merge mode and the first motion information; and performing the conversion based on the first motion information and the second motion information. Compared with the conventional solution, the proposed method can advantageously take local characteristics of a block into consideration and improve the coding efficiency.

In a fourth aspect, a method for video processing is proposed. The method comprises: determining, during a conversion between a target block in a target picture of a video and a bitstream of the video, a regular merge list of regular merge candidates for the target block based on a regular merge mode; determining a geometric partitioning-based merge list of geometric partitioning-based merge candidates based on a geometric partitioning-based merge mode and the regular merge list, the geometric partitioning-based merge list of the geometric partitioning-based merge candidates comprising at least one bi-prediction geometric partitioning-based merge candidate; and performing the conversion based on the regular merge list and the geometric partitioning-based merge list. The method in accordance with the fourth aspect of the present disclosure allows both uni-prediction GPM merge candidates and bi-prediction GPM merge candidates. Compared with the conventional solution, the proposed method can advantageously take local characteristics of a block into consideration and improve the coding efficiency.

In a fifth aspect, an apparatus for processing video data is proposed. The apparatus comprises a processor, and a non-transitory memory coupled to the processor and having instructions stored thereon, wherein the instructions upon execution by the processor, cause the processor to perform a method in accordance with the first, second, third or fourth aspect of the present disclosure.

In a sixth aspect, a non-transitory computer-readable storage medium is proposed. The non-transitory computer-readable storage medium storing instructions that cause a processor to perform a method in accordance with the first, second, third or fourth aspect of the present disclosure.

In a seventh aspect, a non-transitory computer-readable recording medium storing a bitstream of a video which is generated by a method performed by a video processing apparatus, wherein the method in accordance with the first, second, third or fourth aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 8 illustrates a schematic diagram of MMVD search point;

FIG. 9 illustrates an example of decoding side motion vector refinement;

FIG. 10 illustrates examples of the GPM splits grouped by identical angles;

FIG. 13 illustrates a flowchart of a method for video processing in accordance with some embodiments of the present disclosure;

FIG. 14 illustrates a flowchart of a method for video processing in accordance with some embodiments of the present disclosure; and FIG. 15 illustrates a flowchart of a method for video processing in accordance with some embodiments of the present disclosure;

FIG. 16 illustrates a flowchart of a method for video processing in accordance with some embodiments of the present disclosure.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
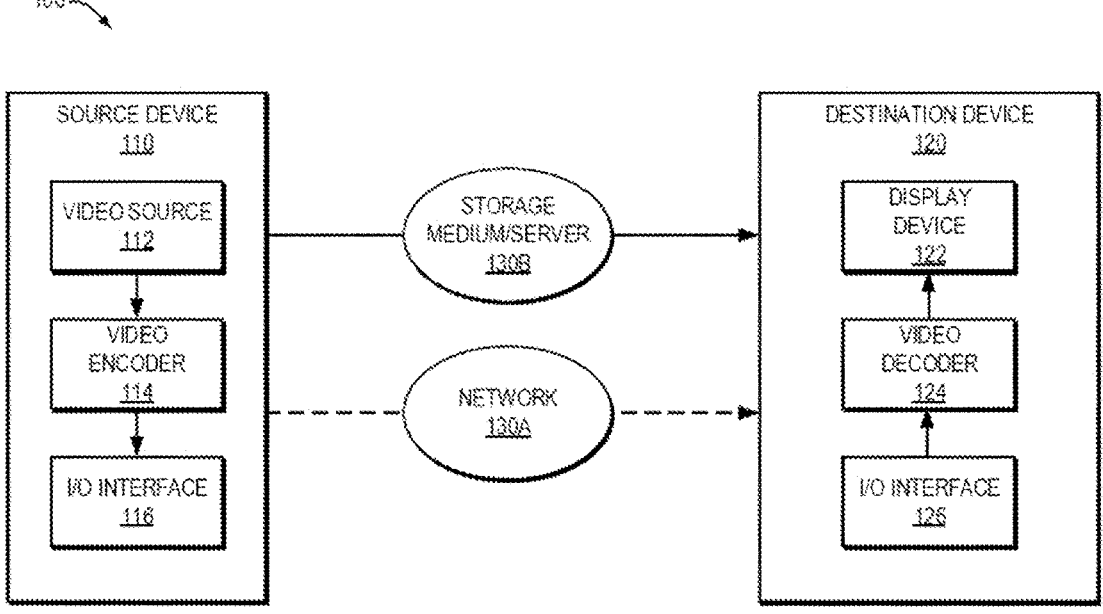
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
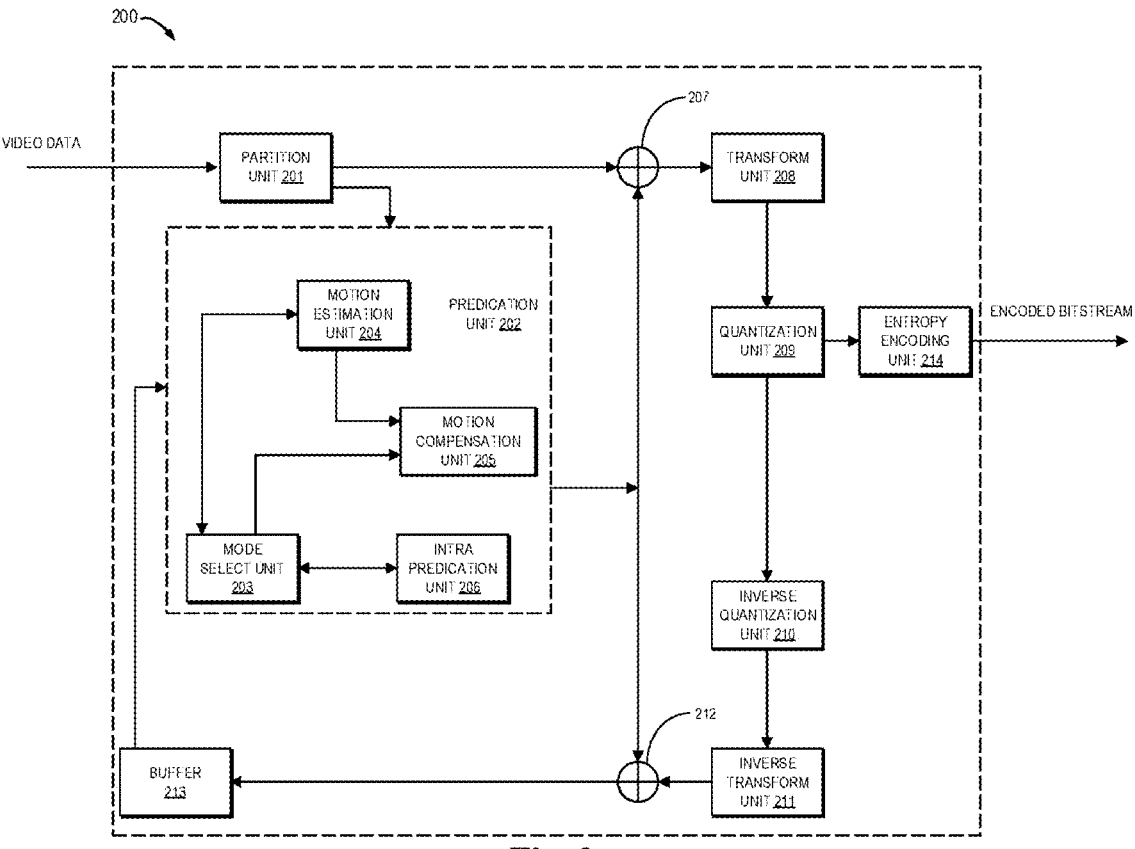
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter predication (CIIP) mode in which the predication is based on an inter predication signal and an intra predication signal. The mode select unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
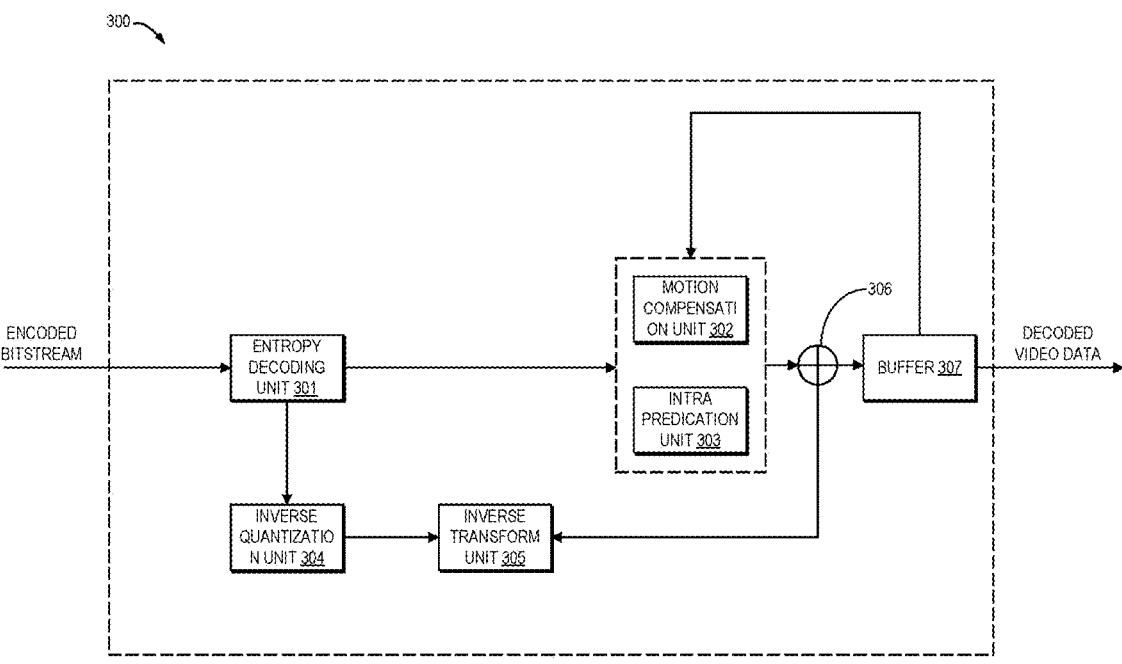
FIG. 3 illustrates a block diagram that illustrates an example video decoder, in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes. i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to video coding technologies. Specifically, it is about inter prediction and related techniques in video coding. It may be applied to the existing video coding standard like HEVC, VVC, and etc. It may be also applicable to future video coding standards or video codec.

2. BACKGROUND

Video coding standards have evolved primarily through the development of the well-known ITU-T and ISO/IEC standards. The ITU-T produced H.261 and H.263. ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards (e.g., ITU-T and ISO/IEC, "High efficiency video coding", Rec. ITU-T H.265|ISO/IEC 23008-2 (in force edition)). Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

3. EXISTING CODING TOOLS (EXTRACTED FROM JVET-R2002)

3.1 Extended Merge Prediction

In VVC, the merge candidate list is constructed by including the following five types of candidates in order:

1) Spatial MVP from spatial neighbour CUs
2) Temporal MVP from collocated CUs
3) History-based MVP from an FIFO table
4) Pairwise average MVP
5) Zero MVs.

The size of merge list is signalled in sequence parameter set header and the maximum allowed size of merge list is 6. For each CU code in merge mode, an index of best merge candidate is encoded using truncated unary binarization (TU). The first bin of the merge index is coded with context and bypass coding is used for other bins.

The derivation process of each category of merge candidates is provided in this session. As done in HEVC. VVC also supports parallel derivation of the merging candidate lists for all CUs within a certain size of area.

3.1.1 Spatial Candidates Derivation

Figure 4:
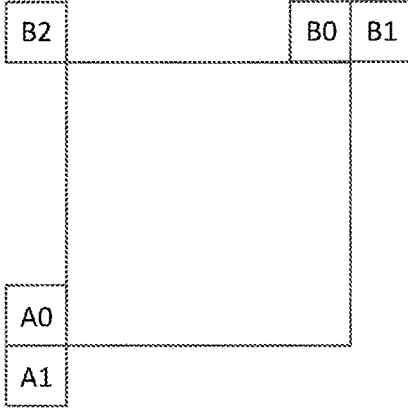
FIG. 4 illustrates a schematic diagram of positions of spatial merge candidate.
Figure 5:
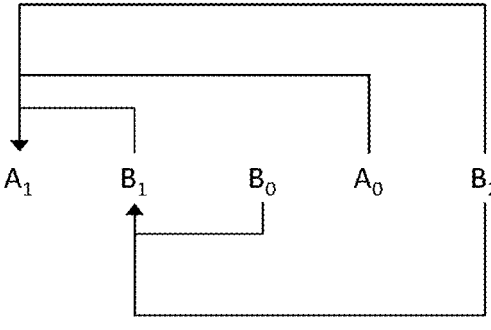
FIG. 5 illustrates a schematic diagram of Candidate pairs considered for redundancy check of spatial merge candidates.

The derivation of spatial merge candidates in VVC is same to that in HEVC except the positions of first two merge candidates are swapped. A maximum of four merge candidates are selected among candidates located in the positions depicted in FIG. 4. The order of derivation is $B_0$, $A_0$, $B_1$, $A_1$ and $B_2$. Position $B_2$ is considered only when one or more than one CUs of position $B_0$, $A_0$, $B_1$, $A_1$ are not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 5 are considered and a candidate is only added to the list if the corresponding candidate used for redundancy check has not the same motion information.

3.1.2 Temporal Candidates Derivation

Figure 6:
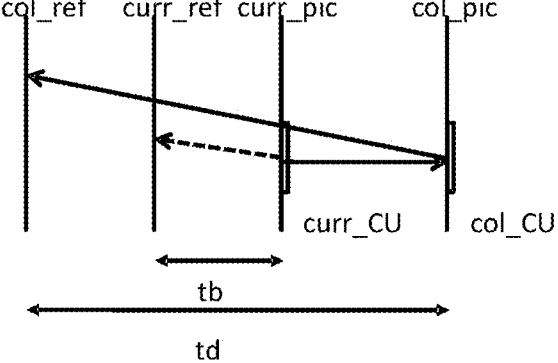
FIG. 6 shows an illustration of motion vector scaling for temporal merge candidate.

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in FIG. 6, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 7:
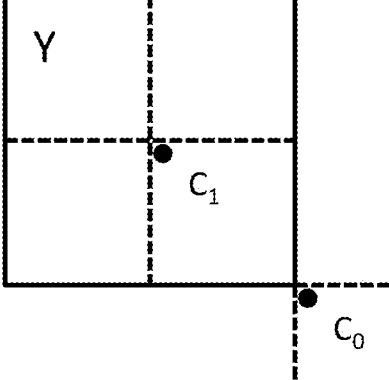
FIG. 7 illustrates a schematic diagram of candidate positions for temporal merge candidate, $C_0$ and $C_1$.

The position for the temporal candidate is selected between candidates $C_0$ and $C_1$, as depicted in FIG. 7. If CU at position $C_0$ is not available, is intra coded, or is outside of the current row of CTUs, position $C_1$ is used. Otherwise, position $C_0$ is used in the derivation of the temporal merge candidate.

3.1.3 History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as $(N<=4)?M: (8–N)$, wherein N indicates number of existing candidates in the merge list and M indicates number of available HMVP candidates in the table.
  2. Once the total number of available merge candidates reaches the maximally allowed merge candidates minus 1, the merge candidate list construction process from HMVP is terminated.

3.1.4 Pair-Wise Average Merge Candidates Derivation

Pairwise average candidates are generated by averaging predefined pairs of candidates in the existing merge candidate list, and the predefined pairs are defined as $\{(0, 1), (0, 2), (1, 2), (0, 3), (1, 3), (2, 3)\}$, where the numbers denote the merge indices to the merge candidate list. The averaged motion vectors are calculated separately for each reference list. If both motion vectors are available in one list, these two motion vectors are averaged even when they point to different reference pictures: if only one motion vector is available, use the one directly; if no motion vector is available, keep this list invalid.

When the merge list is not full after pair-wise average merge candidates are added, the zero MVPs are inserted in the end until the maximum merge candidate number is encountered.

3.1.5 Merge Estimation Region

Merge estimation region (MER) allows independent derivation of merge candidate list for the CUs in the same merge estimation region (MER). A candidate block that is within the same MER to the current CU is not included for the generation of the merge candidate list of the current CU. In addition, the updating process for the history-based motion vector predictor candidate list is updated only if (xCb+cbWidth)>>Log2ParMrgLevel is greater than xCb>>Log2ParMrgLevel and (yCb+cbHeight)>>Log2 ParMrgLevel is great than (yCb>>Log2ParMrgLevel) and where (xCb, yCb) is the top-left luma sample position of the current CU in the picture and (cbWidth, cbHeight) is the CU size. The MER size is selected at encoder side and signalled as log 2_parallel_merge_level_minus2 in the sequence parameter set.

3.2 Merge Mode with MVD (MMVD)

In addition to merge mode, where the implicitly derived motion information is directly used for prediction samples generation of the current CU, the merge mode with motion vector differences (MMVD) is introduced in VVC. A MMVD flag is signalled right after sending a skip flag and merge flag to specify whether MMVD mode is used for a CU.

In MMVD, after a merge candidate is selected, it is further refined by the signalled MVDs information. The further information includes a merge candidate flag, an index to specify motion magnitude, and an index for indication of motion direction. In MMVD mode, one for the first two candidates in the merge list is selected to be used as MV basis. The merge candidate flag is signalled to specify which one is used.

Distance index specifies motion magnitude information and indicate the pre-defined offset from the starting point. As shown in FIG. 8, an offset is added to either horizontal component or vertical component of starting MV. The relation of distance index and pre-defined offset is specified in Table 1.

TABLE 1

| The relation of distance index and pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) | $\frac{1}{4}$ | $\frac{1}{2}$ | 1 | 2 | 4 | 8 | 16 | 32 |

Direction index represents the direction of the MVD relative to the starting point. The direction index can represent of the four directions as shown in Table 2. It's noted that the meaning of MVD sign could be variant according to the information of starting MVs. When the starting MVs is an un-prediction MV or bi-prediction MVs with both lists point to the same side of the current picture (i.e., POCs of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), the sign in Table 2 specifies the sign of MV offset added to the list0 MV component of starting MV and the sign for the list1 MV has opposite value.

TABLE 2

| Sign of MV offset specified by direction index | | | |
|---|---|---|---|
| Direction IDX | 00 | 01 | 10 | 11 |
| x-axis | + | − | N/A | N/A |
| y-axis | N/A | N/A | + | − |

3.3 Decoder Side Motion Vector Refinement (DMVR)

In order to increase the accuracy of the MVs of the merge mode, a bilateral-matching based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 9, the SAD between the blocks 901 and 902 based on each MV candidate around the initial MV is calculated. The MV candidate with the lowest SAD becomes the refined MV and used to generate the bi-predicted signal.

In VVC, the DMVR can be applied for the CUs which are coded with following modes and features:

CU level merge mode with bi-prediction MV

One reference picture is in the past and another reference picture is in the future with respect to the current picture The distances (i.e., POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

3.3.1 Searching Scheme

In DMVR, the search points are surrounding the initial MV and the MV offset obey the MV difference mirroring rule. In other words, any points that are checked by DMVR, denoted by candidate MV pair (MV0, MV1) obey the following two equations:

$$MV0' = MV0 + MV\_offset \quad (1)$$

$$MV1' = MV1 - MV\_offset \quad (2)$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is proposed to favor the original MV during the DMVR process. The SAD between the reference blocks referred by the initial MV candidates is decreased by ¼ of the SAD value.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x, y) = A(x - x_{min})^2 + B(y - y_{min})^2 + C \quad (3)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min} = (E(-1, 0) - E(1, 0))/(2(E(-1, 0) + E(1, 0) - 2E(0, 0))) \quad (4)$$

$$y_{min} = (E(0, -1) - E(0, 1))/(2((E(0, -1) + E(0, 1) - 2E(0, 0))) \quad (5)$$

The value of $x_{min}$ and $y_{min}$ are automatically constrained to be between −8 and 8 since all cost values are positive and the smallest value is E(0,0). This corresponds to half peal offset with ¹⁄₁₆th-pel MV accuracy in VVC. The computed fractional $(x_{min}, y_{min})$ are added to the integer distance refinement MV to get the sub-pixel accurate refinement delta MV.

3.3.2 Bilinear-Interpolation and Sample Padding

In VVC, the resolution of the MVs is ¹⁄₁₆ luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DMVR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

3.3.3 Maximum DMVR Processing Unit

When the width and/or height of a CU are larger than 16 luma samples, it will be further split into subblocks with width and/or height equal to 16 luma samples. The maximum unit size for DMVR searching process is limit to 16×16.

3.4 Geometric Partitioning Mode (GPM) for Inter Prediction

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8.

When this mode is used, a CU is split into two parts by a geometrically located straight line (FIG. 10). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 3.4.1.

If geometric partitioning mode is used for the current CU, then a geometric partition index indicating the partitioning mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 3.4.2. This is the prediction signal for the whole CU, and transform and quantization process will be applied to the whole CU as in other prediction modes. Finally, the motion field of a CU predicted using the geometric partitioning modes is stored as in 3.4.3.

3.4.1 Uni-Prediction Candidate List Construction

Figure 11:
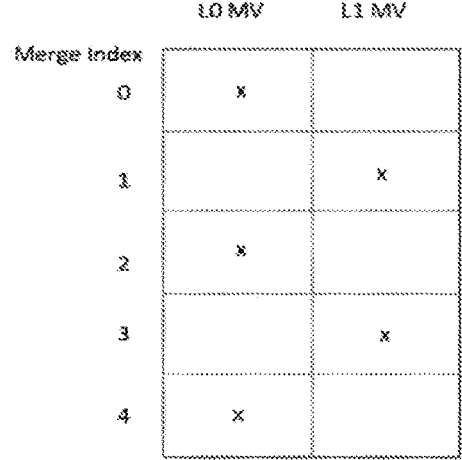
FIG. 11 illustrates a schematic diagram of Uni-prediction MV selection for geometric partitioning mode.

The uni-prediction candidate list is derived directly from the merge candidate list constructed according to the extended merge prediction process in 3.1. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 11. In case a corresponding LX motion vector of the n-the extended merge candidate does not exist, the $L(1-X)$ motion vector of the same candidate is used instead as the uni-prediction motion vector for geometric partitioning mode.

3.4.2 Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \qquad (6)$$

$$\rho_j = \rho_{x,j}\cos(\varphi_i) + \rho_{y,j}\sin(\varphi_i) \qquad (7)$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases} \qquad (8)$$

$$\rho_{y,j} = \begin{cases} \pm(j \times h) \gg 2 & i \% 16 = 8 \text{ or } (i \% 16 \neq 0 \text{ and } h \geq w) \\ 0 & \text{otherwise} \end{cases} \qquad (9)$$

where i, j are the indices for angle and offset of a geometric partition, which depend on the signaled geometric partition index. The sign of $\rho_{x,j}$ and $\rho_{y,j}$ depend on angle index i.

The weights for each part of a geometric partition are derived as following:

$$wIdxL(x, y) = partIdx ? 32 + d(x, y) : 32 - d(x, y) \qquad (10)$$

$$w_0(x, y) = \frac{Clip3(0, 8, (wIdxL(x, y) + 4) \gg 3)}{8} \qquad (11)$$

$$w_1(x, y) = 1 - w_0(x, y) \qquad (12)$$

Figure 12:
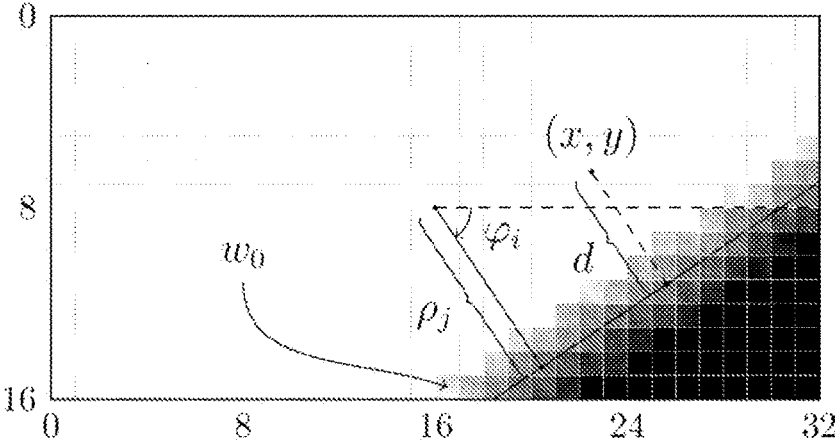
FIG. 12 illustrates a schematic diagram of exemplified generation of a bending weight $w_0$ using geometric partitioning mode.

The partIdx depends on the angle index i. One example of weigh $w_0$ is illustrated in FIG. 12.

3.4.3 Motion Field Storage for Geometric Partitioning Mode

Mv1 from the first part of the geometric partition. Mv2 from the second part of the geometric partition and a combined Mv of Mv1 and Mv2 are stored in the motion filed of a geometric partitioning mode coded CU.

The stored motion vector type for each individual position in the motion filed are determined as:

$$sType = \qquad (13)$$
$$abs(motionIdx) < 32 ? 2 : (motionIdx \leq 0 ? (1 - partIdx) : partIdx)$$

where motionIdx is equal to d(4x+2, 4y+2). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:
1) If Mv1 and Mv2 are from different reference picture lists (one from L0 and the other from L1), then Mv1 and Mv2 are simply combined to form the bi-prediction motion vectors.
2) Otherwise, if Mv1 and Mv2 are from the same list, only uni-prediction motion Mv2 is stored.

3.5 Geometric Partitioning Mode with Motion Vector Differences (GMVD) in JVET-R0357

In this contribution, Geometric partitioning mode with Motion Vector Difference (GMVD) is proposed. With GMVD, each geometric partition in GPM can decide to use GMVD or not. If GMVD is chosen for a geometric region, the MV of the region is calculated as a sum of the MV of a merge candidate and an MVD. All other processing is kept the same as in GPM.

With GMVD, an MVD is signaled as a pair of direction and distance, following the current design of MMVD. That is, there are eight candidate distances (¼-pel, ½-pel, 1-pel, 2-pel, 4-pel, 8-pel, 16-pel, 32-pel), and four candidate directions (toward-left, toward-right, toward-above, and toward-below). In addition, when pic_fpel_mmvd_enabled_flag is equal to 1, the MVD in GMVD is also left shifted by 2 as in MMVD.

4. PROBLEMS

There are several potential issues in the current design of GPM, which are described below.
1) For a signalled GPM candidate index equal to K, the parity of K and the motion information associated with the regular merge candidate index equal to K in the regular merge candidate list is used to derive the motion information used for a GPM coded block. Such a design doesn't consider the local characteristics of a block.
2) Only normal/regular merge candidates generated by extended merge prediction (e.g., section 3.1., e.g., no non-adjacent merge candidates included) is allowed for GPM mode.
   a. Only uni-prediction merge candidates (e.g., which are directly grabbed from the normal/regular merge candidate list based on parity of the merge index) are allowed for GPM block.
   b. There is no pruning process during the GPM merge list construction therefore for two GPM merge candidate indices, they may share the same motion information.

5. EMBODIMENTS OF THE PRESENT DISCLOSURE

The detailed embodiments below should be considered as examples to explain general concepts. These embodiments should not be interpreted in a narrow way. Furthermore, these embodiments can be combined in any manner.

The term 'GPM' may represent a coding method that split one block into two or more sub-regions wherein at least one sub-region is non-rectangular, or non-square, or it couldn't be generated by any of existing partitioning structure (e.g., QT/BT/TT) which splits one block into multiple rectangular sub-regions. In one example, for the GPM coded blocks, one or more weighting masks are derived for a coding block based on how the sub-regions are split, and the final prediction signal of the coding block is generated by a weighted-sum of two or more auxiliary prediction signals associated with the sub-regions.

The term 'GPM' may indicate the geometric merge mode (GEO), and/or geometric partitioning mode (GPM), and/or wedge prediction mode, and/or triangular prediction mode (TPM), and/or a GPM block with motion vector difference (GMVD), and/or a GPM block with motion refinement, and/or any variant based on GPM.

The term 'block' may represent a coding block (CB), a CU, a PU, a TU, a PB, a TB.

The phrase "normal/regular merge candidate" may represent the merge candidates generated by the extended merge prediction process (as illustrated in section 3.1). It may also represent any other advanced merge candidates except GEO merge candidates and subblock based merge candidates.

Note that a part/partition of a GPM block means a part of a geometric partition in the CU. e.g., the two parts of a GPM block in FIG. 10 are split by a geometrically located straight line. Each part of a geometric partition in the CU is inter-predicted using its own motion, but the transform is performed for the whole CU rather than each part/partition of a GPM block.

It should also be noticed that GPM/GMVD applied to other modes (e.g., AMVP mode) may also use the following methods wherein the merge candidate list may be replaced by an AMVP candidate list.

1. It is proposed that the GPM/GMVD candidate index of a block being equal to K may be corresponding to motion information derived from a regular merge candidate with index being equal to M in the regular merge candidate list wherein K is unequal to M. and the derived motion information is used for coding the block.
   a) In one example, M is greater than K.
   b) Whether to use the regular merge candidate with index being equal to K or M may depend on the decoded information and/or the candidates in the regular merge candidate list.
2. Pruning process may be applied during the GPM/GMVD merge list construction wherein motion candidates may be derived using the parity of candidate indices.
   i. In one example, GPM/GMVD merge list is constructed, then the GPM/GMVD merge list is modified by pruning.
   ii. In one example, pruning is applied when inserting a candidate into the GPM/GMVD merge list, during the list construction process.
   iii. For example, full pruning may be applied.
   iv. For example, partial pruning may be applied.
   v. For example, whether to insert a candidate to a GPM/GMVD merge list, may be dependent on whether it has similar/different motion data as compared with one or more candidates in the list.

vi. For example, whether to insert a candidate to a GPM/GMVD merge list, may be dependent on how similar/different between this candidate and one or more candidates in the list.
   vii. For example, the above comparison may be applied between the candidate and all available candidates in the GPM/GMVD merge list.
   viii. For example, the above comparison may be applied between the candidate and one candidate in the GPM/GMVD merge list, wherein the one candidate may be in a predefined position.
   ix. For example, the above comparison may be conducted by checking the motion data difference such as prediction direction (L0. L1), motion vectors, POC value, and/or any other inter-prediction mode (such as affine, BCW, LIC) etc.
   x. For example, the above comparison may be conducted based on a rule that whether the motion difference is greater than or smaller than a threshold.
   xi. For example, the above comparison may be conducted based on a rule that whether the motion of the two are identical.
   xii. In above examples, the GMVD candidate is representing the motion information derived from the associated GPM candidate plus the selected MVD.
3. If the number of valid GPM merge candidates is less than a threshold, at least one additional GPM merge candidate may be generated to fill in the GPM merge candidate list.
   a) For example, the value of the threshold may be obtained by a syntax element.
      i. For example, the syntax element may be a value specifying the maximum GPM merge candidates in the GPM merge candidate list or the maximum number of regular merge candidates.
   b) For example, one or more GPM merge candidates may be generated based on the existing GPM merge candidates in the GPM merge candidate list.
      i. For example, the L0 motion of the first X (such as X=2) L0 predicted GPM merge candidates in the GPM merge list may be averaged and inserted to the GPM merge list as an additional GPM merge candidate.
      ii. For example, the L1 motion of the first X (such as X=2) L1 predicted GPM merge candidates in the GPM merge list may be averaged and inserted to the GPM merge list as an additional GPM merge candidate.
   c) For example, one or more GPM merge candidate may be generated through a history-based GPM merge candidate table.
      i. For example, the history-based GPM merge candidate table is maintained with a length of K (such as K is a constant) GPM motions.
      ii. For example, the history-based GPM merge candidate table contains motion data of L (such as L is a constant) previous coded GPM blocks.
         1. For example, both the two motion vectors of the two parts of a GPM coded block are inserted to the history-based GPM merge candidate table.
         2. For example, one of the two motion vectors of the two parts of a GPM coded block are inserted to the history-based GPM merge candidate table.
      iii. For example, at most M candidates in the history-based GPM merge candidate table can be inserted to the GPM merge list.

d) For example, one or more uni-prediction GPM merge candidates may be generated based on the regular merge candidate and its position in the regular merge candidate list.

i. For example, if the parity of a regular merge candidate is an odd number, its L0 motion data may be extracted to construct the GPM merge candidate list.

ii. For example, if the parity of a regular merge candidate is an even number, its L1 motion data may be extracted to construct the GPM merge candidate list.

e) For example, one or more uni-prediction zero motion vectors may be inserted to the GPM merge list.

i. For example, L0 predicted zero motion vectors may be inserted.

ii. For example, L1 predicted zero motion vectors may be inserted.

iii. For example, how many zero motion vectors is inserted to the list may be dependent on the number of active reference pictures in L0/L1 direction.

1. For example, the zero motion vectors may be inserted with an increasing order of a reference index equal to a value from 0 to the number of active reference pictures in L0/L1 direction.

iv. Alternatively, furthermore, the maximum number of GPM candidates may be larger than that for regular merge candidate list.

4. One or multiple HMVP tables may be maintained for proceeding blocks coded with GPM/GMVD modes.

a) In one example, the motion information of a GPM/GMVD coded blocks (e.g., a pair of motion vectors as well the associated prediction lists/reference picture information) may be used to update the HMVP tables.

b) In one example, those HMVP tables used for GPM/GMVD modes are maintained independently from those used for non-GPM/GMVD modes.

5. Motion information from non-adjacent spatial blocks may be used to derive the motion information of a GPM/GMVD coded block.

a) In one example, non-adjacent spatial merge candidates may be used to build the GPM merge candidate list.

b) For example, the non-adjacent spatial merge candidates may be generated based on the motion data for neighbor blocks which are not directly adjacent to the current block.

6. Denote a GPM candidate index of a block being equal to K. Even the corresponding LX motion vector of the K-th merge candidate exists (X equal to the parity of K), the L(1−X) motion vector of the K-th candidate could still be used to derive the motion information of the block.

a) In one example, whether to use LX or L(1−X) may depend on the motion information of merge candidates in the regular/GPM merge candidate list.

i. In one example, if the LX motion information is identical to one or more GPM candidates with indices smaller than K, then L(1−X) motion information may be used.

b) Whether to insert L0 motion or L1 motion to construct the uni-prediction GPM merge list, may be dependent on the accumulated value of the prediction directions from the already inserted GPM merge candidates in the GPM merge list. Suppose X denotes the number of L0 prediction GPM merge candidates precede the current GPM candidate to be inserted, and Y denotes the number of L1 prediction merge candidates precede the current GPM candidate to be inserted.

i. For example, when X minus Y is no smaller than a threshold (such as 0 or 1 or 2), L1 motion may be extracted from a bi-prediction normal merge candidate and inserted to be as a GPM merge candidate.

1. Additionally, in such case, L1 motion of a L1 prediction normal merge candidate may be directly inserted to be as a GPM merge candidate.

2. Additionally, in such case, a L0 prediction normal merge candidate may be projected to L1 and inserted to be as a GPM merge candidate.

ii. For example, when X minus Y is no greater than a threshold (such as 0 or −1 or −2), L0 motion may be extracted from a bi-prediction normal merge candidate and inserted to be as a GPM merge candidate.

1. Additionally, in such case, L0 motion of a L0 prediction normal merge candidate may be directly inserted to be as a GPM merge candidate.

2. Additionally, in such case, a L1 prediction normal merge candidate may be projected to L0 and inserted to be as a GPM merge candidate.

7. In one example, one bi-prediction normal merge candidate may generate two uni-prediction GPM merge candidates, and both added to GPM/GMVD candidate list.

a) For example, the L0 motion of the bi-prediction normal merge candidate may be used to form a uni-prediction GPM merge candidate, while the L1 motion of the same normal merge candidate is used to form another uni-prediction GPM merge candidate.

8. In one example, both uni-prediction GPM merge candidates and bi-prediction GPM merge candidates may be allowed.

a) For example, it may be allowed that one part of a GPM block is coded from uni-prediction, while the other part of the GPM block is coded from bi-prediction.

b) For example, both the two parts of a GPM block are coded from bi-prediction.

c) For example, when the two parts of a GPM block are coded from uni-prediction, it may be required that one is from L0 prediction, and the other is from L1 prediction.

9. In one example, the regular MMVD based motion vector may be used to build the GPM merge candidate list.

a) For example, L0 or L1 (but not both) motion of the regular MMVD based motion vector may be inserted to the GPM merge candidate list.

b) For example, both L0 and L1 motion of the regular MMVD based motion vector may be inserted to the GPM merge candidate list.

c) For example, the GPM related syntax elements may be signalled in case of regular MMVD is used to the video unit.

10. In one example, the GPM merge candidates in the GPM list may be reordered based on a rule.

a) For example, the rule may be defined as sorting a template cost from small to big values.

b) For example, the template cost may be based on the sum of sample difference between left and/or above neighboring reconstructed samples of the current block and the corresponding neighbors of the reference block.

11. In one example, a GMVD candidate may be compared with a GMVD candidate or a GPM candidate.

a) For example, if the final motion information (after reconstructing the MV from the base MV and MV difference) of a first GMVD candidate is the same or similar to that of a second GMVD or GPM candidate, then the first GMVD candidate is pruned, i.e. it is removed from the possible candidate that can be represented.

b) For example, if the final motion information (after reconstructing the MV from the base MV and MV difference) of a first GMVD candidate is the same or similar to that of a second GMVD or GPM candidate, then the first GMVD candidate is modified.

i. For example, the final MV may be added by a shifting value.

ii. For example, the first GMVD candidate may be modified more than once, until it is not same or similar to a second GMVD or GPM candidate.

c) The comparison method may be defined in bullet 2.

FIG. 13 illustrates a flowchart of a method 1300 for video processing in accordance with some embodiments of the present disclosure. The method 1300 comprises: determining 1302, during a conversion between a target block in a target picture of a video and a bitstream of the video, first motion information of the target block based on a regular merge mode, the first motion information comprising a regular merge list of regular merge candidates for the target block; determining 1304 second motion information from the first motion information based on a geometric partitioning-based merge mode and a redundancy check, the second motion information comprising a geometric partitioning-based merge list of geometric partitioning-based merge candidates for the target block; and performing 1306 the conversion based on the first motion information and the second motion information.

In the context of the present disclosure, the term "geometric partitioning-based merge mode" refers to the GPM or the GPM with motion vector differences (MVDs).

The method 1300 enables the pruning process to be applied during the GPM/GMVD merge list construction in which the motion candidates may be derived based on the parity of candidate indices. Compared with the conventional solution without the pruning process, GPM/GMVD merge candidates will not share the same motion information in accordance with some embodiments of the present disclosure. As a result, the coding efficiency can be advantageously improved, and the computational efficiency can be reduced.

In some embodiments, the geometric partitioning-based merge mode may comprise the GPM, and wherein if the target block of the video is coded by the GPM, determining third motion information and fourth motion information for the first block, and generating a final prediction for the target block based on a weighted sum of prediction samples derived from the third motion information and the fourth motion information.

In some embodiments, the geometric partitioning-based merge mode may comprise the GPM with MVDs, and wherein if the target block of the video is coded by the geometric partitioning mode with motion vector differences, determining fifth motion information and sixth motion information for the target block; and generating a final prediction for the target block based on the fifth motion information, the sixth motion information and MVD information based on a weighted sum of prediction samples.

In some embodiments, the geometric partitioning-based merge mode comprises a geometric partitioning mode with motion vector differences (MVD), and wherein the determining comprises: if a second block of the video is coded by the geometric partitioning mode with motion vector differences, determining fifth motion information for a first part of the second block and sixth motion information for a second part of the second block; generating a first prediction for the second block based on a sum of prediction samples derived from the fifth motion information and the sixth motion information; generating a second prediction for the second block based on the first prediction and MVD information; and determining the second motion information based on the second prediction for the second block.

In some embodiments, determining 1304 the second motion information may comprise determining one of the GPM/GMVD merge candidates associated with a second index based on a regular merge candidate associated with a first index, and the first index is different from the second index. By way of example, the GPM/GMVD candidate index of a block is K. and may correspond to motion information derived from a regular merge candidate with an index M in the regular merge candidate list, where K is unequal to M, and the derived motion information is used for coding the block.

In some embodiments, a value of the first index may be greater than a value of the second index, such as, M>K. As such, solution for video processing provided in the present disclosure can take the local characteristics of a video block into account.

In some embodiments, whether to use the regular merge candidate associated with the first index or a regular merge candidate associated with the second index for determining the GPM/GMVD merge candidate associated with the second index may be based on at least one of decoded information and the regular merge candidates in the regular merge list. In the above example, whether to use the regular merge candidate with index K or M may depend on the decoded information and/or the candidates in the regular merge candidate list.

In some embodiments, determining 1304 the second motion information may comprise: determining, based on a parity of each of candidate indices, a first list of GPM/GMVD merge candidates from the regular merge list of regular merge candidates; performing the redundancy check on the GPM/GMVD merge candidates in the first list; and determining the GPM/GMVD merge list of GPM/GMVD merge candidates by pruning the first list of GPM/GMVD merge candidates based on the redundancy check. That is, a pruning process may be applied during the GPM/GMVD merge list construction according to the embodiments of the present disclosure. In this way, the GPM/GMVD merge list may be modified by the pruning process.

In some embodiments, determining 1304 the second motion information based on the redundancy check may comprise: determining, based on a parity of a candidate index, a target GPM/GMVD merge candidate from the regular merge list of regular merge candidates; and determining the second motion information by inserting the target GPM/GMVD merge candidate into the GPM/GMVD merge list or pruning the GPM/GMVD merge list based on the redundancy check.

In some embodiments, the pruning may comprise one of a full pruning or a partial pruning. In the full pruning process, motion data or information of a GPM/GMVD merge candidate is compared with that of all the GPM/GMVD merge candidates already existed in the GPM/GMVD merge list. In the partial pruning process, motion data or information of a GPM/GMVD merge candidate is compared with that of part of the GPM/GMVD merge candidates already existed in the GPM/GMVD merge list.

In some embodiments, determining the second motion information by inserting the target GPM/GMVD merge candidate into the GPM/GMVD merge list or pruning the GPM/GMVD merge list may comprise: if the target GPM/GMVD merge candidate has similar motion data as at least one of GPM/GMVD merge candidates in the GPM/GMVD merge list, pruning the target GPM/GMVD merge candidate into the GPM/GMVD merge list; and if the target GPM/GMVD merge candidate has different motion data as at least one of GPM/GMVD merge candidates in the GPM/GMVD merge list, inserting the GPM/GMVD merge list.

In some embodiments, determining the second motion information by inserting the target GPM/GMVD merge candidate into the GPM/GMVD merge list or pruning the GPM/GMVD merge list may comprise: determining a similarity between the target GPM/GMVD merge candidate and at least one of GPM/GMVD merge candidates in the GPM/GMVD merge list; if the similarity does not exceed a threshold, inserting the target GPM/GMVD merge candidate into the GPM/GMVD merge list; and if the similarity exceeds the threshold, pruning the GPM/GMVD merge list. In this case, whether to insert a target GPM/GMVD merge candidate into the GPM/GMVD merge list may depend on how similar or different between this target GPM/GMVD merge candidate and one or more candidates already existed in the list.

In some embodiments, determining the similarity may comprise determining the similarity between the target GPM/GMVD merge candidate and all the GPM/GMVD merge candidates in the GPM/GMVD merge list. By way of example, in the full pruning process, the comparison of motion data may be applied between the target candidate and all the candidates available in the GPM/GMVD merge list.

In some embodiments, determining the similarity may comprise determining the similarity between the target GPM/GMVD merge candidate and at least one GPM/GMVD merge candidate in at least one predefined position in the GPM/GMVD merge list. By way of example, in the partial pruning process, the comparison of motion data may be applied between the target candidate and at least one candidate in the GPM/GMVD merge list, and the at least one candidate may be in a predefined position in the GPM/GMVD merge list.

In some embodiments, determining the similarity may comprise checking a difference between motion data of the target GPM/GMVD merge candidate and motion data of at least one of GPM/GMVD merge candidates in the GPM/GMVD merge list, and the motion data may comprise at least one of a prediction direction (L0, L1), motion vectors, a POC value, and at least one inter-prediction mode. The at least one inter-prediction mode may be, for example, affine, BCW, LIC, etc. For example, the prediction direction (L0. L1) may be as shown in FIG. 9.

In some embodiments, determining the similarity may be based on whether a difference between motion data of the target GPM/GMVD merge candidate and motion data of at least one of GPM/GMVD merge candidates in the GPM/GMVD merge list is greater than or smaller than a threshold. In this case, a rule that whether the motion difference is greater than or smaller than a threshold may be predefined or signaled.

In some embodiments, determining the similarity may be based on whether motion data of the target GPM/GMVD merge candidate and motion data of at least one of GPM/GMVD merge candidates in the GPM/GMVD merge list is identical. In this case, a rule that whether the motion data or information of the two candidates are identical may be predefined or signaled.

In some embodiments, the GPM/GMVD merge candidates may comprise GMVD merge candidates representing motion information derived from GPM merge candidates associated with GMVD merge candidates plus selected MVDs.

According to the above embodiments of the present disclosure, the pruning process can be applied during the GPM/GMVD merge list is built. In this way, the redundant motion information is removed, and thus, the computational complexity of the video processing can be reduced, and the coding speed and efficiency can be improved.

In some embodiments, determining 1304 the second motion information may comprise: if the number of the GPM/GMVD merge candidates in the GPM/GMVD merge list does not exceed a threshold, generating at least one additional GPM/GMVD merge candidate; and inserting the at least one additional GPM/GMVD merge candidate into the GPM/GMVD merge list. In this case, if the number of valid GPM merge candidates is less than a threshold, at least one additional GPM merge candidate may be generated to fill in the GPM merge candidate list. The value of the threshold may be obtained by a syntax element. It should be understood that the syntax element may be of any suitable format without limiting the present disclosure.

In some embodiments, the method 1300 may further comprise: obtaining a syntax element indicative of the threshold, the syntax element comprising a value specifying a maximum number of GPM/GMVD merge candidates in the GPM/GMVD merge list or a maximum number of regular merge candidates.

In some embodiments, the at least one additional GPM/GMVD merge candidate may be generated based on the GPM/GMVD merge candidates already existed in the GPM/GMVD merge list. By way of example, the L0 motion of the first X (such as, X=2) L0 predicted GPM/GMVD merge candidates in the GPM/GMVD merge list may be averaged, and inserted into the GPM/GMVD merge list as an additional GPM merge candidate. By way of another example, the L1 motion of the first X (such as X=2) L1 predicted GPM/GMVD merge candidates in the GPM/GMVD merge list may be averaged and inserted to the GPM/GMVD merge list as an additional GPM/GMVD merge candidate.

In some embodiments, generating the at least one additional GPM/GMVD merge candidate may comprise: generating the at least one additional GPM/GMVD merge candidate by averaging L0 motion of a first number of L0 predicted GPM/GMVD merge candidates in the GPM/GMVD merge list, the first number is predefined.

In some embodiments, generating the at least one additional GPM/GMVD merge candidate may comprise: generating the at least one additional GPM/GMVD merge candidate by averaging L1 motion of a second number of L1 predicted GPM/GMVD merge candidates in the GPM/GMVD merge list, the second number is predefined.

In some embodiments, generating the at least one additional GPM/GMVD merge candidate may comprise: generating the at least one additional GPM/GMVD merge candidate based on a history-based GPM merge candidate table.

In some embodiments, the history-based GPM merge candidate table may be maintained with a length of K GPM motions, where K is constant or predefined.

In some embodiments, the history-based GPM merge candidate table may contain motion data of L video blocks previously coded by GPM/GMVD mode, where a value of L is predefined or constant.

In some embodiments, two motion vectors of two parts of a video block coded by GPM/GMVD mode may be inserted into the history-based GPM merge candidate table.

In some embodiments, one of two motion vectors of two parts of a video block coded by GPM/GMVD mode may be inserted into the history-based GPM merge candidate table.

In some embodiments, the number of candidates in the history-based GPM merge candidate table to be inserted into the GPM/GMVD merge list may not exceed a threshold M, and the threshold M is predefined. In this case, at most M candidates in the history-based GPM merge candidate table can be inserted to the GPM merge list.

In some embodiments, the at least one additional GPM/GMVD merge candidate may be at least one uni-prediction GPM merge candidate, and generating the at least one additional GPM/GMVD merge candidate may comprise: generating the at least one uni-prediction GPM merge candidate based on one of the regular merge candidates and a position of the regular merge candidate in the regular merge candidate list.

In some embodiments, generating the at least one uni-prediction GPM merge candidate may comprise: if a parity of the regular merge candidate is an odd number, extracting L0 motion data of the regular merge candidate for generating the at least one uni-prediction GPM merge candidate; and if the parity of the regular merge candidate is an even number, extracting L1 motion data of the regular merge candidate for generating the at least one uni-prediction GPM merge candidate.

In some embodiments, the at least one additional GPM/GMVD merge candidate may be at least one uni-prediction zero motion vector. According to the embodiments of the present disclosure, one or more uni-prediction zero motion vectors are allowed to be inserted into the GPM/GMVD merge list.

In some embodiments, at least one uni-prediction zero motion vector may comprise at least one of the following: at least one L0 predicted zero motion vector, and at least one L1 predicted zero motion vector.

In some embodiments, the number of the at least one uni-prediction zero motion vector may be based on the number of active reference pictures in L0 or L1 direction. For example, the zero motion vectors may be inserted with an increasing order of a reference index equal to a value from 0 to the number of active reference pictures in L0/L1 direction.

In some embodiments, inserting the at least one additional GPM/GMVD merge candidate into the GPM/GMVD merge list may comprise: inserting the at least one zero motion vector with an increasing order of a reference index ranging from 0 to the number of the active reference pictures in L0 or L1 direction.

In some embodiments, a maximum number of GPM/GMVD merge candidates available in the GPM/GMVD merge list may be larger than a maximum number of regular merge candidates available in the regular merge candidate list.

In some embodiments, at least one history-based MVP (HMVP) table may be maintained for proceeding a video block coded by GPM/GMVD mode.

In some embodiments, the at least one HMVP table may be updated based on motion information of the video block coded by GPM/GMVD mode. The motion information may comprise a pair of motion vectors and prediction lists and/or reference picture information associated with the video block coded by GPM/GMVD mode.

In some embodiments, the at least one HMVP table for GPM/GMVD mode may be maintained independently at least one HMVP table for non-GPM/GMVD mode.

In some embodiments, one of the GPM/GMVD merge candidates for the target block may be indexed with K, and a LX motion vector of the K-th regular merge candidate exists, where X is equal to 0 or 1 and corresponds to the parity of K. In these embodiments, the method 1300 may further comprise: determining motion formation of the target block based on one of the LX motion vector or a L(1−X) motion vector of the K-th regular merge candidate.

In some embodiments, whether to use the LX motion vector or the L(1−X) motion vector for determining the motion formation of the target block may be based on at least one of the first motion information of the regular merge candidates in the regular merge list and the second motion information of the GPM/GMVD merge candidates in the GPM/GMVD merge list.

In some embodiments, the motion information of the L(1−X) motion vector may be used for determining the motion formation of the target block, if the motion information of the LX motion vector is identical to motion information of at least one GPM/GMVD merge candidate with an index smaller than K.

In some embodiments, the GPM/GMVD merge list may comprise a uni-prediction GPM/GMVD merge list, and wherein whether to use L0 motion vector or L1 motion vector for determining the uni-prediction GPM/GMVD merge list is based on an accumulated value of prediction directions from the GPM/GMVD merge candidates already inserted in the uni-prediction GPM/GMVD merge list.

In some embodiments, the number of L0 predicted GPM/GMVD merge candidates that precede a current GPM/GMVD merge candidate to be inserted is X. and the number of L1 predicted GPM/GMVD merge candidates that precede a current GPM/GMVD merge candidate to be inserted is Y. In these embodiments, if a difference between X and Y is not less than a threshold, the L1 motion vector may be extracted from a bi-prediction regular merge candidate, and inserted into the uni-prediction GPM/GMVD merge list as a GPM/GMVD merge candidate.

In some embodiments, the L1 motion vector of a L1 predicted regular merge candidate may be directly inserted into the uni-prediction GPM/GMVD merge list as a GPM/GMVD merge candidate.

In some embodiments, the method 1300 may further comprise: projecting a L0 predicted regular merge candidate to a prediction direction L1; and inserting the projected regular merge candidate into the uni-prediction GPM/GMVD merge list as a GPM/GMVD merge candidate.

In some embodiments, if a difference between X and Y is not greater than the threshold, the L0 motion vector may be extracted from the bi-prediction regular merge candidate, and inserted into the uni-prediction GPM/GMVD merge list as a GPM/GMVD merge candidate.

In some embodiments, the L0 motion vector of a L0 predicted regular merge candidate may be directly inserted into the uni-prediction GPM/GMVD merge list as a GPM/GMVD merge candidate.

In some embodiments, the method 1300 may further comprise: projecting a L1 predicted regular merge candidate to a prediction direction L0; and inserting the projected regular merge candidate into the uni-prediction GPM/GMVD merge list as a GPM/GMVD merge candidate.

In some embodiments, the regular merge candidates in the regular merge list comprise at least one bi-prediction regular merge candidate. In these embodiments, determining the second motion information may comprise: generating two uni-prediction GPM/GMVD merge candidates based on each of the at least one bi-prediction regular merge candidate; and adding the two uni-prediction GPM/GMVD merge candidates for each bi-prediction regular merge candidate into the GPM/GMVD merge list.

In some embodiments, each of the at least one bi-prediction regular merge candidate may comprise L0 motion vector and L1 motion vector. In these embodiments, generating the two uni-prediction GPM/GMVD merge candidates may comprise: forming a uni-prediction GPM/GMVD merge candidate in the GPM/GMVD merge list based on the L0 motion vector of the bi-prediction regular merge candidate; and forming another uni-prediction GPM/GMVD merge candidate in the GPM/GMVD merge list based on the L1 motion vector of the bi-prediction regular merge candidate.

In some embodiments, the GPM/GMVD merge candidates in the GPM/GMVD merge list may comprise uni-prediction GPM/GMVD merge candidates, or bi-prediction GPM/GMVD merge candidates.

In some embodiments, the method 1300 may further comprise: partitioning the target block into two parts based on GPM/GMVD mode; coding, based on GPM/GMVD mode, one of the two parts of the target block from a uni-prediction; and coding based on GPM/GMVD mode, the other one of the two parts of the target block from bi-prediction.

In some embodiments, the method 1300 may further comprise: partitioning the target block into two parts based on GPM/GMVD mode; and coding, based on GPM/GMVD mode, the two parts of the target block from bi-prediction.

In some embodiments, the method 1300 may further comprise: partitioning the target block into two parts based on GPM/GMVD mode; and coding, based on GPM/GMVD mode, the two parts of the target block from uni-prediction.

In some embodiments, one of the two parts of the target block is coded from prediction direction L0, and the other one of the two parts of the target block is coded from prediction direction L1.

In some embodiments, determining 1304 the second motion information may comprise: determining regular merge mode with motion vector differences (MMVD) based motion vectors of the regular merge candidates based on regular MMVD mode and MVD information; and determining the GPM/GMVD merge candidates based on the regular MMVD based motion vectors.

In some embodiments, determining the GPM/GMVD merge candidates may comprise: inserting L0 motion vector or L1 motion vector of one of the regular MMVD based motion vectors into the GPM/GMVD merge list.

In some embodiments, determining the GPM/GMVD merge candidates may comprise: inserting both L0 motion vector and L1 motion vector of one of the regular MMVD based motion vectors into the GPM/GMVD merge list.

In some embodiments, the method 1300 may further comprise: obtaining at least one GPM/GMVD related syntax element indicative of the regular MMVD mode to be used for the target block.

In some embodiments, determining 1304 the second motion information may comprise: reordering the GPM/GMVD merge candidates in the GPM/GMVD merge list based on a predefined rule.

In some embodiments, wherein the GPM/GMVD merge candidates are reordered based on the predefined rule for sorting a template cost in ascending order.

According to the example embodiments of the present disclosure, the GPM/GMVD merge candidates can be reordered during the GPM/GMVD merge list is built based on a predefined or signaled rule. The reordered GPM/GMVD merge candidates require less storage space. Thus, the coding efficiency and compression ratios can be improved.

In some embodiments, the template cost is determined based on a sum of sample difference between left and/or above neighboring reconstructed samples of the target block and the corresponding neighbors of a reference block.

In some embodiments, the GPM/GMVD merge candidates in the GPM/GMVD merge list may comprise GMVD merge candidates. In these embodiments, determining the second motion information may comprise: determining the second motion information by inserting a target GMVD merge candidate into the GPM/GMVD merge list, if the target GMVD merge candidate does not have the same or similar motion information as at least one of the GMVD merge candidates already existed in the GPM/GMVD merge list; and determining the second motion information by pruning the GPM/GMVD merge list, if the target GMVD merge candidate does not have the same or similar motion information as at least one of the GMVD merge candidates already existed in the GPM/GMVD merge list.

In some embodiments, determining the second motion information by pruning the GPM/GMVD merge list may comprise: determining the target GMVD merge candidate from a final MV reconstructed based on a base MV and a MV difference; determining whether motion information of the target GMVD merge candidate is the same or similar as motion information of a GPM/GMVD merge candidate already existed in the GPM/GMVD merge list; and if the motion information of the target GMVD merge candidate is the same or similar as the motion information of the GPM/GMVD merge candidate already existed in the GPM/GMVD merge list, pruning the GPM/GMVD merge list by not inserting the target GMVD merge candidate into the GPM/GMVD merge list.

In some embodiments, determining the second motion information by inserting the target GMVD merge candidate into the GPM/GMVD merge list may comprise: determining a first GMVD merge candidate from a final MV reconstructed based on a base MV and a MV difference; determining whether motion information of the first GMVD merge candidate is the same or similar as motion information of a second GPM/GMVD merge candidate already existed in the GPM/GMVD merge list; if the motion information of the first GMVD merge candidate is the same or similar as the motion information of the second GPM/GMVD merge candidate, modifying the first GMVD merge candidate to the target GMVD merge candidate; and inserting the target GMVD merge candidate into the GPM/GMVD merge list.

In some embodiments, modifying the first GMVD merge candidate may comprise adding the final MV by a shifting value.

In some embodiments, the first GMVD merge candidate may be modified more than once, until the motion information of the first GMVD merge candidate is not the same or similar to the motion information of the second GPM/GMVD merge candidate.

In some embodiments, the method 1300 may further comprise: performing a redundancy check on the GMVD merge candidates in the GPM/GMVD merge list; and determining whether the target GMVD merge candidate has the same or similar motion information from at least one of the GMVD merge candidates already existed in the GPM/GMVD merge list based on the redundancy check. By way of example, the pruning may comprise one of a full pruning or a partial pruning.

In some embodiments, determining the second motion information by inserting the target GMVD merge candidate into the GPM/GMVD merge list or pruning the GPM/GMVD merge list may comprise: determining a similarity between the target GMVD merge candidate and at least one of the GMVD merge candidates already existed in the GPM/GMVD merge list; if the similarity does not exceed a threshold, inserting the target GMVD merge candidate into the GPM/GMVD merge list; and if the similarity exceeds the threshold, pruning the GPM/GMVD merge list by not inserting the target GMVD merge candidate into the GPM/GMVD merge list.

In some embodiments, determining the similarity may comprise: determining the similarity between the target GMVD merge candidate and all the GMVD merge candidates existed in the GPM/GMVD merge list.

In some embodiments, determining the similarity may comprise: determining the similarity between the target GMVD merge candidate and at least one GMVD merge candidate in at least one predefined position in the GPM/GMVD merge list.

In some embodiments, determining the similarity may comprise: checking a difference between motion data of the target GMVD merge candidate and motion data of at least one of GMVD merge candidates in the GPM/GMVD merge list, and the motion data may comprise at least one of a prediction direction (L0, L1), motion vectors, a POC value, and at least one inter-prediction mode.

In some embodiments, determining the similarity may comprise: checking whether a difference between motion data of the target GMVD merge candidate and motion data of at least one of GMVD merge candidates already existed in the GPM/GMVD merge list is greater than or smaller than a threshold.

In some embodiments, determining the similarity may comprise: checking whether motion data of the target GMVD merge candidate and motion data of at least one of GMVD merge candidates already existed in the GPM/GMVD merge list is identical.

In some embodiments, the conversion in 1306 may comprise: decoding the target picture from the bitstream of the video.

In some embodiments, the conversion in 1306 may comprise: encoding the target picture into the bitstream of the video. The solution for video processing provided in the present disclosure can support both of video decoding and encoding processes.

FIG. 14 illustrates a flowchart of another method 1400 for video processing in accordance with some embodiments of the present disclosure. The method 1400 comprises: determining 1402, during a conversion between at least one first block in a target picture of a video and a bitstream of the video, third motion information of the at least one first block based on a regular merge mode; determining 1404 fourth motion information of a second block in the target picture based on a geometric partitioning-based merge mode and the third motion information, the at least one first block not spatially adjacent to the second block in the target picture; and performing 1406 the conversion based on the third motion information and the fourth motion information.

The method 1400 in accordance with the embodiments of the present disclosure employs motion information of neighbor blocks which are not spatially adjacent to the current block to derive motion information of a GPM/GMVD coded block. Compared with the conventional solution, the proposed method can advantageously improve the coding efficiency.

In some embodiments, the third motion information may comprise non-adjacent spatial merge candidates for the at least one first block. Thus, the coding speed and efficiency can be improved.

In some embodiments, determining 1402 the third motion information may comprise: generating non-adjacent spatial merge candidates based on motion data of the at least one first block not directly adjacent to the second block.

In some embodiments, the conversion in 1406 may comprise: decoding the target picture from the bitstream of the video.

In some embodiments, the conversion in 1406 may comprise: encoding the target picture into the bitstream of the video. The solution for video processing provided in the present disclosure can support both of video decoding and encoding processes.

FIG. 15 illustrates a flowchart of another method 1500 for video processing in accordance with some embodiments of the present disclosure. The method 1500 comprises: determining 1502, during a conversion between a target block in a target picture of a video and a bitstream of the video, first motion information of the target block based on a regular merge mode and motion difference information; determining 1504 second motion information of the target block based on a geometric partitioning-based merge mode and the first motion information; and performing 1506 the conversion based on the first motion information and the second motion information.

The method 1500 in accordance with the embodiments of the present disclosure employs the regular MMVD based motion vector in building the GPM merge candidate list. Compared with the conventional solution, the proposed method can advantageously take local characteristics of a block into consideration and improve the coding efficiency.

In some embodiments, determining 1504 the second motion information may comprise: determining regular merge mode with motion vector differences (MMVD) based motion vectors of the regular merge candidates based on regular MMVD mode and MVD information; and determining the GPM/GMVD merge candidates based on the regular MMVD based motion vectors.

In some embodiments, determining the GPM/GMVD merge candidates may comprise: inserting L0 motion vector or L1 motion vector of one of the regular MMVD based motion vectors into the GPM/GMVD merge list.

In some embodiments, determining the GPM/GMVD merge candidates may comprise: inserting both L0 motion vector and L1 motion vector of one of the regular MMVD based motion vectors into the GPM/GMVD merge list.

In some embodiments, the method 1500 may further comprise: obtaining at least one GPM/GMVD related syntax element indicative of the regular MMVD mode to be used for the target block.

In some embodiments, the conversion in 1506 may comprise: decoding the target picture from the bitstream of the video.

In some embodiments, the conversion in 1506 may comprise: encoding the target picture into the bitstream of the video. The solution for video processing provided in the present disclosure can support both of video decoding and encoding processes.

FIG. 16 illustrates a flowchart of another method 1600 for video processing in accordance with some embodiments of the present disclosure. The method 1600 comprises: determining 1602, during a conversion between a target block in a target picture of a video and a bitstream of the video, a regular merge list of regular merge candidates for the target block based on a regular merge mode; determining 1604 a geometric partitioning-based merge list of geometric partitioning-based merge candidates based on a geometric partitioning-based merge mode and the regular merge list, the geometric partitioning-based merge list of the geometric partitioning-based merge candidates comprising at least one bi-prediction geometric partitioning-based merge candidate; and performing 1606 the conversion based on the regular merge list and the geometric partitioning-based merge list.

The method 1500 in accordance with the embodiments of the present disclosure allows both uni-prediction GPM merge candidates and bi-prediction GPM merge candidates. Compared with the conventional solution, the proposed method can advantageously take local characteristics of a block into consideration and improve the coding efficiency.

In some embodiments, the GPM/GMVD merge candidates in the GPM/GMVD merge list may comprise at least one uni-prediction GPM/GMVD merge candidates.

In some embodiments, the method 1600 may further comprise: partitioning the target block into two parts based on GPM/GMVD mode; coding, based on GPM/GMVD mode, one of the two parts of the target block from a uni-prediction; and coding based on GPM/GMVD mode, the other one of the two parts of the target block from bi-prediction.

In some embodiments, the method 1600 may further comprise: partitioning the target block into two parts based on GPM/GMVD mode; and coding, based on GPM/GMVD mode, the two parts of the target block from bi-prediction.

In the above embodiments, the video block can be coded by GPM/GMVD mode based on not only uni-prediction merge candidates which are directly extracted from the regular merge candidate list based on parity of the merge index, but also bi-prediction merge candidates. Therefore, the coding speed and efficiency can be advantageously improved.

In some embodiments, the method 1600 may further comprise: partitioning the target block into two parts based on GPM/GMVD mode; and coding, based on GPM/GMVD mode, the two parts of the target block from uni-prediction.

In some embodiments, one of the two parts of the target block may be coded from prediction direction L0, and the other one of the two parts of the target block may be coded from prediction direction L1.

In some embodiments, the conversion in 1606 may comprise: decoding the target picture from the bitstream of the video.

In some embodiments, the conversion in 1606 may comprise: encoding the target picture into the bitstream of the video. The solution for video processing provided in the present disclosure can support both of video decoding and encoding processes.

Implementations of the present disclosure can be described in view of the following clauses, the features of which can be combined in any reasonable manner.

Clause 1. A method for video processing, comprising: determining, during a conversion between a target block in a target picture of a video and a bitstream of the video, first motion information of the target block based on a regular merge mode, the first motion information comprising a regular merge list of regular merge candidates for the target block; determining second motion information from the first motion information based on a geometric partitioning-based merge mode and a redundancy check, the second motion information comprising a geometric partitioning-based merge list of geometric partitioning-based merge candidates for the target block; and performing the conversion based on the first motion information and the second motion information.

Clause 2. The method of clause 1, wherein the geometric partitioning-based merge mode comprises a geometric partitioning mode (GPM), and wherein the determining comprises: if a first block of the video is coded by the GPM, determining third motion information for a first part of the first block and fourth motion information for a second part of the first block; generating a final prediction for the first block based on a weighted sum of prediction samples derived from the third motion information and the fourth motion information; and determining the second motion information based on the final prediction.

Clause 3. The method of clause 1, wherein the geometric partitioning-based merge mode comprises a geometric partitioning mode with motion vector differences (MVD), and wherein the determining comprises: if a second block of the video is coded by the geometric partitioning mode with motion vector differences, determining fifth motion information for a first part of the second block and sixth motion information for a second part of the second block; generating a first prediction for the second block based on a sum of prediction samples derived from the fifth motion information and the sixth motion information; generating a second prediction for the second block based on the first prediction and MVD information; and determining the second motion information based on the second prediction for the second block.

Clause 4. The method of clause 1, wherein determining the second motion information comprises: determining, based on a regular merge candidate associated with a first index, one of the geometric partitioning-based merge candidates associated with a second index, the first index being different from the second index.

Clause 5. The method of clause 4, wherein a value of the first index is greater than a value of the second index.

Clause 6. The method of clause 4, wherein whether to use the regular merge candidate associated with the first index or a regular merge candidate associated with the second index for determining the geometric partitioning-based merge candidate associated with the second index is based on at least one of decoded information and the regular merge candidates in the regular merge list.

Clause 7. The method of clause 1, wherein determining the second motion information comprises: determining, based on a parity of each of candidate indices, a first list of geometric partitioning-based merge candidates from the regular merge list of regular merge candidates; performing the redundancy check on the geometric partitioning-based merge candidates in the first list; and determining the geometric partitioning-based merge list of geometric partitioning-based merge candidates by pruning the first list of geometric partitioning-based merge candidates based on the redundancy check.

Clause 8. The method of clause 1, wherein determining the second motion information based on the redundancy check comprises: determining, based on a parity of a candidate index, a target geometric partitioning-based merge candidate from the regular merge list of regular merge candidates; and determining the second motion information by inserting the target geometric partitioning-based merge candidate into the geometric partitioning-based merge list or pruning the geometric partitioning-based merge list based on the redundancy check.

Clause 9. The method of clause 7 or 8, wherein the pruning comprises one of a full pruning or a partial pruning.

Clause 10. The method of clause 8, wherein determining the second motion information by inserting the target geometric partitioning-based merge candidate into the geometric partitioning-based merge list or pruning the geometric partitioning-based merge list comprises: if the target geometric partitioning-based merge candidate has similar motion data as at least one of MVD merge candidates in the geometric partitioning-based merge list, pruning the target geometric partitioning-based merge candidate into the geometric partitioning-based merge list, and if the target geometric partitioning-based merge candidate has different motion data as at least one of geometric partitioning-based merge candidates in the geometric partitioning-based merge list, inserting the geometric partitioning-based merge list.

Clause 11. The method of clause 8, wherein determining the second motion information by inserting the target geometric partitioning-based merge candidate into the geometric partitioning-based merge list or pruning the geometric partitioning-based merge list comprises: determining a similarity between the target geometric partitioning-based merge candidate and at least one of geometric partitioning-based merge candidates in the geometric partitioning-based merge list; if the similarity does not exceed a threshold, inserting the target geometric partitioning-based merge candidate into the geometric partitioning-based merge list; and if the similarity exceeds the threshold, pruning the geometric partitioning-based merge list.

Clause 12. The method of clause 11, wherein determining the similarity comprises: determining the similarity between the target geometric partitioning-based merge candidate and all the geometric partitioning-based merge candidates in the geometric partitioning-based merge list.

Clause 13. The method of clause 11, wherein determining the similarity comprises: determining the similarity between the target geometric partitioning-based merge candidate and at least one geometric partitioning-based merge candidate in at least one predefined position in the geometric partitioning-based merge list.

Clause 14. The method of clause 11, wherein determining the similarity comprises: checking a difference between motion data of the target geometric partitioning-based merge candidate and motion data of at least one of geometric partitioning-based merge candidates in the geometric partitioning-based merge list, and the motion data comprises at least one of a prediction direction (L0, L1), motion vectors, a POC value, and at least one inter-prediction mode.

Clause 15. The method of clause 11, wherein determining the similarity is based on whether a difference between motion data of the target geometric partitioning-based merge candidate and motion data of at least one of geometric partitioning-based merge candidates in the geometric partitioning-based merge list is greater than or smaller than a threshold.

Clause 16. The method of clause 11, wherein determining the similarity is based on whether motion data of the target geometric partitioning-based merge candidate and motion data of at least one of geometric partitioning-based merge candidates in the geometric partitioning-based merge list is identical.

Clause 17. The method of any of clauses 1 to 16, wherein the geometric partitioning-based merge candidates comprise GMVD merge candidates representing motion information derived from GPM merge candidates associated with GMVD merge candidates plus selected MVDs.

Clause 18. The method of any of clauses 1 to 17, wherein determining the second motion information comprises: if the number of the geometric partitioning-based merge candidates in the geometric partitioning-based merge list does not exceed a threshold, generating at least one additional geometric partitioning-based merge candidate; and inserting the at least one additional geometric partitioning-based merge candidate into the geometric partitioning-based merge list.

Clause 19. The method of clause 18, further comprising: obtaining a syntax element indicative of the threshold, the syntax element comprising a value specifying a maximum number of geometric partitioning-based merge candidates in the geometric partitioning-based merge list or a maximum number of regular merge candidates.

Clause 20. The method of clause 18 or 19, wherein the at least one additional geometric partitioning-based merge candidate is generated based on the geometric partitioning-based merge candidates already existed in the geometric partitioning-based merge list.

Clause 21. The method of any of clauses 18 to 20, wherein generating the at least one additional geometric partitioning-based merge candidate comprises: generating the at least one additional geometric partitioning-based merge candidate by averaging L0 motion of a first number of L0 predicted geometric partitioning-based merge candidates in the geometric partitioning-based merge list, the first number is predefined.

Clause 22. The method of any of clauses 18 to 20, wherein generating the at least one additional geometric partitioning-based merge candidate comprises: generating the at least one additional geometric partitioning-based merge candidate by averaging L1 motion of a second number of L1 predicted geometric partitioning-based merge candidates in the geometric partitioning-based merge list, the second number is predefined.

Clause 23. The method of any of clauses 18 to 20, wherein generating the at least one additional geometric partitioning-based merge candidate comprises: generating the at least one additional geometric partitioning-based merge candidate based on a history-based GPM merge candidate table.

Clause 24. The method of clause 23, wherein the history-based GPM merge candidate table is maintained with a length of K GPM motions, and a value of K is predefined or constant.

Clause 25. The method of clause 23, wherein the history-based GPM merge candidate table contains motion data of L video blocks previously coded by geometric partitioning-based merge mode, and a value of L is predefined or constant.

Clause 26. The method of clause 25, wherein two motion vectors of two parts of a video block coded by geometric partitioning-based merge mode are inserted into the history-based GPM merge candidate table.

Clause 27. The method of clause 25, wherein one of two motion vectors of two parts of a video block coded by geometric partitioning-based merge mode is inserted into the history-based GPM merge candidate table.

Clause 28. The method of clause 23, wherein the number of candidates in the history-based GPM merge candidate table to be inserted into the geometric partitioning-based merge list does not exceed a threshold M, and the threshold M is predefined.

Clause 29. The method of any of clauses 18 to 20, wherein the at least one additional geometric partitioning-based merge candidate comprises at least one uni-prediction GPM merge candidate, and wherein generating the at least one additional geometric partitioning-based merge candidate comprises: generating the at least one uni-prediction GPM merge candidate based on one of the regular merge candidates and a position of the regular merge candidate in the regular merge candidate list.

Clause 30. The method of clause 29, wherein generating the at least one uni-prediction GPM merge candidate comprises: if a parity of the regular merge candidate is an odd number, extracting L0 motion data of the regular merge candidate for generating the at least one uni-prediction GPM merge candidate; and if the parity of the regular merge candidate is an even number, extracting L1 motion data of the regular merge candidate for generating the at least one uni-prediction GPM merge candidate.

Clause 31. The method of any of clauses 18 to 20, wherein the at least one additional geometric partitioning-based merge candidate comprises at least one uni-prediction zero motion vector.

Clause 32. The method of clause 31, wherein at least one uni-prediction zero motion vector comprises at least one of the following: at least one L0 predicted zero motion vector, and at least one L1 predicted zero motion vector.

Clause 33. The method of clause 31 or 32, wherein the number of the at least one uni-prediction zero motion vector is based on the number of active reference pictures in L0 or L1 direction.

Clause 34. The method of Clause 33, wherein inserting the at least one additional geometric partitioning-based merge candidate into the geometric partitioning-based merge list comprises: inserting the at least one zero motion vector with an increasing order of a reference index ranging from 0 to the number of the active reference pictures in L0 or L1 direction.

Clause 35. The method of clause 31, wherein a maximum number of geometric partitioning-based merge candidates available in the geometric partitioning-based merge list is larger than a maximum number of regular merge candidates available in the regular merge candidate list.

Clause 36. The method of clause 1, wherein at least one history-based MVP (HMVP) table is maintained for proceeding a video block coded by the geometric partitioning-based merge mode.

Clause 37. The method of clause 36, wherein the at least one HMVP table is updated based on motion information of the video block coded by the geometric partitioning-based merge mode, and the motion information comprises a pair of motion vectors and prediction lists and/or reference picture information associated with the video block coded by the geometric partitioning-based merge mode.

Clause 38. The method of clause 36, wherein the at least one HMVP table for the geometric partitioning-based merge mode is maintained independently at least one HMVP table for a non-geometric partitioning-based merge mode.

Clause 39. The method of clause 1, wherein one of the geometric partitioning-based merge candidates for the target block is indexed with K, and a LX motion vector of the K-th regular merge candidate exists, where X is equal to 0 or 1 and corresponds to the parity of K, and the method further comprises: determining motion formation of the target block based on one of the LX motion vector or a L(1−X) motion vector of the K-th regular merge candidate.

Clause 40. The method of clause 39, wherein whether to use the LX motion vector or the L(1−X) motion vector for determining the motion formation of the target block is based on at least one of the first motion information of the regular merge candidates in the regular merge list and the second motion information of the geometric partitioning-based merge candidates in the geometric partitioning-based merge list.

Clause 41. The method of clause 40, wherein motion information of the L(1−X) motion vector is used for determining the motion formation of the target block, if motion information of the LX motion vector is identical to motion information of at least one geometric partitioning-based merge candidate with an index smaller than K.

Clause 42. The method of clause 39, wherein the geometric partitioning-based merge list comprises a uni-prediction geometric partitioning-based merge list, and wherein whether to use L0 motion vector or L1 motion vector for determining the uni-prediction geometric partitioning-based merge list is based on an accumulated value of prediction directions from the geometric partitioning-based merge candidates already inserted in the uni-prediction geometric partitioning-based merge list.

Clause 43. The method of clause 42, wherein the number of L0 predicted geometric partitioning-based merge candidates that precede a current geometric partitioning-based merge candidate to be inserted is X, and the number of L1 predicted geometric partitioning-based merge candidates that precede a current geometric partitioning-based merge candidate to be inserted is Y. and wherein if a difference between X and Y is not less than a threshold, the L1 motion vector is extracted from a bi-prediction regular merge candidate, and inserted into the uni-prediction geometric partitioning-based merge list as a geometric partitioning-based merge candidate.

Clause 44. The method of clause 43, wherein the L1 motion vector of a L1 predicted regular merge candidate is directly inserted into the uni-prediction geometric partitioning-based merge list as a geometric partitioning-based merge candidate.

Clause 45. The method of clause 43, further comprising: projecting a L0 predicted regular merge candidate to a prediction direction L1; and inserting the projected regular merge candidate into the uni-prediction geometric partitioning-based merge list as a geometric partitioning-based merge candidate.

Clause 46. The method of clause 43, wherein if a difference between X and Y is not greater than the threshold, the L0 motion vector is extracted from the bi-prediction regular merge candidate, and inserted into the uni-prediction geometric partitioning-based merge list as a geometric partitioning-based merge candidate.

Clause 47. The method of clause 46, wherein the L0 motion vector of a L0 predicted regular merge candidate is directly inserted into the uni-prediction geometric partitioning-based merge list as a geometric partitioning-based merge candidate.

Clause 48. The method of clause 46, further comprising: projecting a L1 predicted regular merge candidate to a prediction direction L0; and inserting the projected regular merge candidate into the uni-prediction geometric partitioning-based merge list as a geometric partitioning-based merge candidate.

Clause 49. The method of clause 1, wherein the regular merge candidates in the regular merge list comprise at least one bi-prediction regular merge candidate, and wherein determining the second motion information comprises: generating two uni-prediction geometric partitioning-based merge candidates based on each of the at least one bi-prediction regular merge candidate; and adding the two uni-prediction geometric partitioning-based merge candidates for each bi-prediction regular merge candidate into the geometric partitioning-based merge list.

Clause 50. The method of clause 49, wherein each of the at least one bi-prediction regular merge candidate comprises L0 motion vector and L1 motion vector, and wherein generating the two uni-prediction geometric partitioning-based merge candidates comprises: forming a uni-prediction geometric partitioning-based merge candidate in the geometric partitioning-based merge list based on the L0 motion vector of the bi-prediction regular merge candidate; and forming another uni-prediction geometric partitioning-based merge candidate in the geometric partitioning-based merge list based on the L1 motion vector of the bi-prediction regular merge candidate.

Clause 51. The method of clause 1, wherein the geometric partitioning-based merge candidates in the geometric partitioning-based merge list comprise uni-prediction geometric partitioning-based merge candidates, or bi-prediction geometric partitioning-based merge candidates.

Clause 52. The method of clause 51, further comprising: partitioning the target block into two parts based on the geometric partitioning-based merge mode; coding, based on the geometric partitioning-based merge mode, one of the two parts of the target block from a uni-prediction; and coding based on the geometric partitioning-based merge mode, the other one of the two parts of the target block from bi-prediction.

Clause 53. The method of clause 51, further comprising: partitioning the target block into two parts based on the geometric partitioning-based merge mode; and coding, based on the geometric partitioning-based merge mode, the two parts of the target block from bi-prediction.

Clause 54. The method of clause 51, further comprising: partitioning the target block into two parts based on the geometric partitioning-based merge mode; and coding, based on the geometric partitioning-based merge mode, the two parts of the target block from uni-prediction.

Clause 55. The method of clause 54, wherein one of the two parts of the target block is coded from prediction direction L0, and the other one of the two parts of the target block is coded from prediction direction L1.

Clause 56. The method of clause 1, wherein determining the second motion information comprises: determining regular merge mode with motion vector differences (MMVD) based motion vectors of the regular merge candidates based on regular MMVD mode and MVD information: and determining the geometric partitioning-based merge candidates based on the regular MMVD based motion vectors.

Clause 57. The method of clause 56, wherein determining the geometric partitioning-based merge candidates comprises: inserting L0 motion vector or L1 motion vector of one of the regular MMVD based motion vectors into the geometric partitioning-based merge list.

Clause 58. The method of clause 56, wherein determining the geometric partitioning-based merge candidates comprises: inserting both L0 motion vector and L1 motion vector of one of the regular MMVD based motion vectors into the geometric partitioning-based merge list.

Clause 59. The method of clause 56, further comprising: obtaining at least one geometric partitioning-based merge mode related syntax element indicative of the regular MMVD mode to be used for the target block.

Clause 60. The method of clause 1, wherein determining the second motion information comprises: reordering the geometric partitioning-based merge candidates in the geometric partitioning-based merge list based on a predefined rule.

Clause 61. The method of clause 60, wherein the geometric partitioning-based merge candidates are reordered based on the predefined rule for sorting a template cost in ascending order.

Clause 62. The method of clause 61, wherein the template cost is determined based on a sum of sample difference between left and/or above neighboring reconstructed samples of the target block and the corresponding neighbors of a reference block.

Clause 63. The method of clause 1, wherein the geometric partitioning-based merge candidates in the geometric partitioning-based merge list comprises merge candidates coded by a geometric partitioning mode with motion vector differences, and wherein determining the second motion information comprises: determining the second motion information by inserting a target merge candidate coded by the geometric partitioning mode with motion vector differences into the geometric partitioning-based merge list, if the target merge candidate does not have the same or similar motion information as at least one of candidates already existed in the geometric partitioning-based merge list; and determining the second motion information by pruning the geometric partitioning-based merge list, if the target merge candidate does not have the same or similar motion information as at least one of the merge candidates already existed in the geometric partitioning-based merge list.

Clause 64. The method of clause 63, wherein determining the second motion information by pruning the geometric partitioning-based merge list comprises: determining the target merge candidate from a final MV reconstructed based on a base MV and a MV difference; determining whether motion information of the target merge candidate is the same or similar as motion information of a candidate already existed in the geometric partitioning-based merge list; and if the motion information of the target merge candidate is the same or similar as the motion information of the candidate already existed in the geometric partitioning-based merge list, pruning the geometric partitioning-based merge list by not inserting the target merge candidate into the geometric partitioning-based merge list.

Clause 65. The method of clause 63, wherein determining the second motion information by inserting the target merge candidate into the geometric partitioning-based merge list comprises: determining a first merge candidate from a final MV reconstructed based on a base MV and a MV difference; determining whether motion information of the first merge candidate is the same or similar as motion information of a second merge candidate already existed in the geometric partitioning-based merge list; if the motion information of the first merge candidate is the same or similar as the motion information of the second merge candidate, modifying the first merge candidate to the target merge candidate; and inserting the target merge candidate into the geometric partitioning-based merge list.

Clause 66. The method of clause 65, wherein modifying the first merge candidate comprises: adding the final MV by a shifting value.

Clause 67. The method of clause 65 or 66, wherein the first merge candidate is modified more than once, until the motion information of the first merge candidate is not the same or similar to the motion information of the second merge candidate.

Clause 68. The method of clause 63, further comprising: performing a redundancy check on the merge candidates already existed in the geometric partitioning-based merge list, and wherein whether the target merge candidate has the same or similar motion information from at least one of the merge candidates already existed in the geometric partitioning-based merge list is based on the redundancy check.

Clause 69. The method of clause 68, wherein the pruning comprises one of a full pruning or a partial pruning.

Clause 70. The method of clause 63, wherein determining the second motion information by inserting the target merge candidate into the geometric partitioning-based merge list or pruning the geometric partitioning-based merge list comprises: determining a similarity between the target merge candidate and at least one of the merge candidates already existed in the geometric partitioning-based merge list; if the similarity does not exceed a threshold, inserting the target merge candidate into the geometric partitioning-based merge list; and if the similarity exceeds the threshold, pruning the geometric partitioning-based merge list by not inserting the target merge candidate into the geometric partitioning-based merge list.

Clause 71. The method of clause 70, wherein determining the similarity comprises: determining the similarity between the target merge candidate and all the merge candidates existed in the geometric partitioning-based merge list.

Clause 72. The method of clause 70, wherein determining the similarity comprises: determining the similarity between the target merge candidate and at least one GMVD merge candidate in at least one predefined position in the geometric partitioning-based merge list.

Clause 73. The method of clause 70, wherein determining the similarity comprises: checking a difference between motion data of the target merge candidate and motion data of at least one of merge candidates in the geometric partitioning-based merge list, and the motion data comprises at least one of a prediction direction (L0, L1), motion vectors, a POC value, and at least one inter-prediction mode.

Clause 74. The method of clause 70, wherein determining the similarity is based on whether a difference between motion data of the target merge candidate and motion data of at least one of merge candidates already existed in the geometric partitioning-based merge list is greater than or smaller than a threshold.

Clause 75. The method of clause 70, wherein determining the similarity is based on whether motion data of the target merge candidate and motion data of at least one of merge candidates already existed in the geometric partitioning-based merge list is identical.

Clause 76. The method of any of clauses 1 to 75, wherein the conversion comprises decoding the target block from the bitstream of the video.

Clause 77. The method of any of clauses 1 to 75, wherein the conversion comprises encoding the target block into the bitstream of the video.

Clause 78. An apparatus for processing video data, comprising: a processor; and a non-transitory memory coupled to the processor and having instructions stored thereon, wherein the instructions upon execution by the processor, cause the processor to perform a method in accordance with any of clauses 1-77.

Clause 79. A non-transitory computer-readable storage medium storing instructions that cause a processor to perform a method in accordance with any of clauses 1-77.

Clause 80. A non-transitory computer-readable recording medium storing a bitstream of a video which is generated by a method performed by a video processing apparatus, wherein the method comprises: determining, during a conversion between a target block in a target picture of a video and a bitstream of the video, first motion information of the target block based on a regular merge mode, the first motion information comprising a regular merge list of regular merge candidates for the target block; determining second motion information from the first motion information based on a geometric partitioning-based merge mode and a redundancy check, the second motion information comprising a geometric partitioning-based merge list of geometric partitioning-based merge candidates for the target block; and generating the bitstream based on the first motion information and the second motion information.

Clause 81. A method for storing a bitstream of a video, comprising: determining, during a conversion between a target block in a target picture of a video and the bitstream of the video, first motion information of the target block based on a regular merge mode, the first motion information comprising a regular merge list of regular merge candidates for the target block; determining second motion information from the first motion information based on a geometric partitioning-based merge mode and a redundancy check, the second motion information comprising a geometric partitioning-based merge list of geometric partitioning-based merge candidates for the target block; generating the bitstream based on the first motion information and the second motion information; and storing the bitstream in a non-transitory computer-readable recording medium.

Clause 82. A method for video processing, comprising: determining, during a conversion between at least one first block in a target picture of a video and a bitstream of the video, third motion information of the at least one first block based on a regular merge mode; determining fourth motion information of a second block in the target picture based on a geometric partitioning-based merge mode and the third motion information, the at least one first block not spatially adjacent to the second block in the target picture; and performing the conversion based on the third motion information and the fourth motion information.

Clause 83. The method of clause 82, wherein the third motion information comprises non-adjacent spatial merge candidates for the at least one first block.

Clause 84. The method of clause 83, wherein determining the third motion information comprises: generating non-adjacent spatial merge candidates based on motion data of the at least one first block not directly adjacent to the second block.

Clause 85. The method of any of clauses 82 to 84, wherein the conversion comprises decoding the target picture from the bitstream of the video.

Clause 86. The method of any of clauses 82 to 84, wherein the conversion comprises encoding the target picture into the bitstream of the video.

Clause 87. An apparatus for processing video data, comprising: a processor; and a non-transitory memory coupled to the processor and having instructions stored thereon, wherein the instructions upon execution by the processor, cause the processor to perform a method in accordance with any of clauses 82-86.

Clause 88. A non-transitory computer-readable storage medium storing instructions that cause a processor to perform a method in accordance with any of clauses 82-86.

Clause 89. A non-transitory computer-readable recording medium storing a bitstream of a video which is generated by a method performed by a video processing apparatus, wherein the method comprises: determining, during a conversion between at least one first block in a target picture of a video and a bitstream of the video, third motion information of the at least one first block based on a regular merge mode: determining fourth motion information of a second block in the target picture based on a geometric partitioning-based merge mode and the third motion information, the at least one first block not spatially adjacent to the second block in the target picture; and generating the bitstream based on the third motion information and the fourth motion information.

Clause 90. A method for storing a bitstream of a video, comprising: determining, during a conversion between at least one first block in a target picture of a video and a bitstream of the video, third motion information of the at least one first block based on a regular merge mode; determining fourth motion information of a second block in the target picture based on a geometric partitioning-based merge mode and the third motion information, the at least one first block not spatially adjacent to the second block in the target picture; generating the bitstream based on the third motion information and the fourth motion information; and storing the bitstream in a non-transitory computer-readable recording medium.

Clause 91. A method for video processing, comprising: determining, during a conversion between a target block in a target picture of a video and a bitstream of the video, first motion information of the target block based on a regular merge mode and motion difference information; determining second motion information of the target block based on a geometric partitioning-based merge mode and the first motion information; and performing the conversion based on the first motion information and the second motion information.

Clause 92. The method of clause 91, wherein determining the second motion information comprises: determining regular merge mode with motion vector differences (MMVD) based motion vectors of the regular merge candidates based on regular MMVD mode and MVD information; and determining the geometric partitioning-based merge candidates based on the regular MMVD based motion vectors.

Clause 93. The method of clause 92, wherein determining the geometric partitioning-based merge candidates comprises: inserting L0 motion vector or L1 motion vector of one of the regular MMVD based motion vectors into the geometric partitioning-based merge list.

Clause 94. The method of clause 92, wherein determining the geometric partitioning-based merge candidates comprises: inserting both L0 motion vector and L1 motion vector of one of the regular MMVD based motion vectors into the geometric partitioning-based merge list.

Clause 95. The method of clause 92, further comprising: obtaining at least one geometric partitioning-based merge mode related syntax element indicative of the regular MMVD mode to be used for the target block.

Clause 96. The method of any of clauses 91 to 95, wherein the conversion comprises decoding the target picture from the bitstream of the video.

Clause 97. The method of any of clauses 91 to 95, wherein the conversion comprises encoding the target picture into the bitstream of the video.

Clause 98. An apparatus for processing video data, comprising: a processor; and a non-transitory memory coupled to the processor and having instructions stored thereon, wherein the instructions upon execution by the processor, cause the processor to perform a method in accordance with any of clauses 91-97.

Clause 99. A non-transitory computer-readable storage medium storing instructions that cause a processor to perform a method in accordance with any of clauses 91-97.

Clause 100. A non-transitory computer-readable recording medium storing a bitstream of a video which is generated by a method performed by a video processing apparatus, wherein the method comprises: determining, during a conversion between a target block in a target picture of a video and a bitstream of the video, first motion information of the target block based on a regular merge mode and motion difference information; determining second motion information of the target block based on a geometric partitioning-based merge mode and the first motion information; and generating the bitstream based on the first motion information and the second motion information.

Clause 101. A method for storing a bitstream of a video, comprising: determining, during a conversion between a target block in a target picture of a video and a bitstream of the video, first motion information of the target block based on a regular merge mode and motion difference information; determining second motion information of the target block based on a geometric partitioning-based merge mode and the first motion information; generating the bitstream based on the first motion information and the second motion information; and storing the bitstream in a non-transitory computer-readable recording medium.

Clause 102. A method for video processing, comprising: determining, during a conversion between a target block in a target picture of a video and a bitstream of the video, a regular merge list of regular merge candidates for the target block based on a regular merge mode; determining a geometric partitioning-based merge list of geometric partitioning-based merge candidates based on a geometric partitioning-based merge mode and the regular merge list, the geometric partitioning-based merge list of the geometric partitioning-based merge candidates comprising at least one bi-prediction geometric partitioning-based merge candidate; and performing the conversion based on the regular merge list and the geometric partitioning-based merge list.

Clause 103. The method of clause 102, wherein the geometric partitioning-based merge candidates in the geometric partitioning-based merge list comprise at least one uni-prediction geometric partitioning-based merge candidates.

Clause 104. The method of clause 102, further comprising: partitioning the target block into two parts based on the geometric partitioning-based merge mode; coding, based on the geometric partitioning-based merge mode, one of the two parts of the target block from a uni-prediction; and coding, based on the geometric partitioning-based merge mode, the other one of the two parts of the target block from bi-prediction.

Clause 105. The method of clause 102, further comprising: partitioning the target block into two parts based on the geometric partitioning-based merge mode; and coding, based on the geometric partitioning-based merge mode, the two parts of the target block from bi-prediction.

Clause 106. The method of clause 102, further comprising: partitioning the target block into two parts based on the geometric partitioning-based merge mode; and coding, based on the geometric partitioning-based merge mode, the two parts of the target block from uni-prediction.

Clause 107. The method of clause 106, wherein one of the two parts of the target block is coded from prediction direction L0, and the other one of the two parts of the target block is coded from prediction direction L1.

Clause 108. The method of any of clauses 102 to 107, wherein the conversion comprises decoding the target picture from the bitstream of the video.

Clause 109. The method of any of clauses 102 to 107, wherein the conversion comprises encoding the target picture into the bitstream of the video.

Clause 110. An apparatus for processing video data, comprising: a processor; and a non-transitory memory coupled to the processor and having instructions stored thereon, wherein the instructions upon execution by the processor, cause the processor to perform a method in accordance with any of clauses 102-109.

Clause 111. A non-transitory computer-readable storage medium storing instructions that cause a processor to perform a method in accordance with any of clauses 102-109.

Clause 112. A non-transitory computer-readable recording medium storing a bitstream of a video which is generated by a method performed by a video processing apparatus, wherein the method comprises: determining, during a conversion between a target block in a target picture of a video and a bitstream of the video, a regular merge list of regular merge candidates for the target block based on a regular merge mode; determining a geometric partitioning-based merge list of geometric partitioning-based merge candidates based on a geometric partitioning-based merge mode and the regular merge list, the geometric partitioning-based merge list of the geometric partitioning-based merge candidates comprising at least one bi-prediction geometric partitioning-based merge candidate; and generating the bitstream based on the regular merge list and the geometric partitioning-based merge list.

Clause 113. A method for storing a bitstream of a video, comprising: determining, during a conversion between a target block in a target picture of a video and a bitstream of the video, a regular merge list of regular merge candidates for the target block based on a regular merge mode; determining a geometric partitioning-based merge list of geometric partitioning-based merge candidates based on a geometric partitioning-based merge mode and the regular merge list, the geometric partitioning-based merge list of the geometric partitioning-based merge candidates comprising at least one bi-prediction geometric partitioning-based merge candidate; generating the bitstream based on the regular merge list and the geometric partitioning-based merge list; and storing the bitstream in a non-transitory computer-readable recording medium.

Example Device

Figure 17:
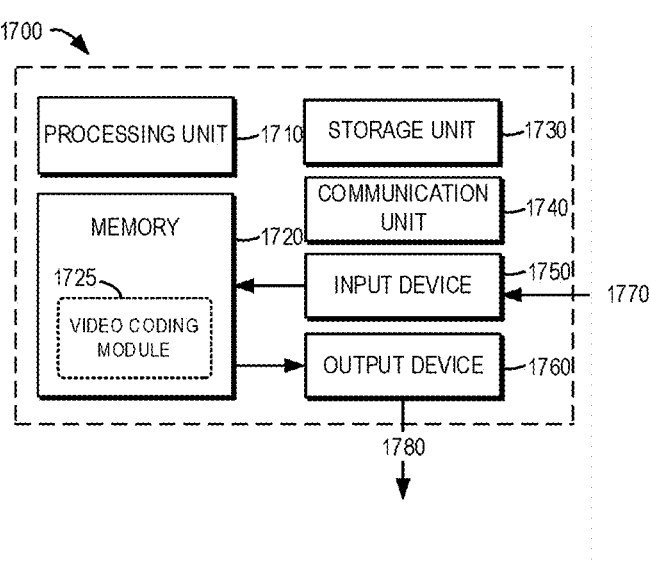
FIG. 17 illustrates a block diagram of a computing device in which various embodiments of the present disclosure can be implemented.

FIG. 17 illustrates a block diagram of a computing device 1700 in which various embodiments of the present disclosure can be implemented. The computing device 1700 may be implemented as or included in the source device 110 (or the video encoder 114 or 200) or the destination device 120 (or the video decoder 124 or 300).

It would be appreciated that the computing device 1700 shown in FIG. 17 is merely for purpose of illustration, without suggesting any limitation to the functions and scopes of the embodiments of the present disclosure in any manner.

As shown in FIG. 17, the computing device 1700 includes a general-purpose computing device 1700. The computing device 1700 may at least comprise one or more processors or processing units 1710, a memory 1720, a storage unit 1730, one or more communication units 1740, one or more input devices 1750, and one or more output devices 1760.

In some embodiments, the computing device 1700 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 170 can support any type of interface to a user (such as "wearable" circuitry and the like).

The processing unit 1710 may be a physical or virtual processor and can implement various processes based on programs stored in the memory 1720. In a multi-processor system, multiple processing units execute computer executable instructions in parallel so as to improve the parallel processing capability of the computing device 1770. The processing unit 1710 may also be referred to as a central processing unit (CPU), a microprocessor, a controller or a microcontroller.

The computing device 1700 typically includes various computer storage medium. Such medium can be any medium accessible by the computing device 1700, including, but not limited to, volatile and non-volatile medium, or detachable and non-detachable medium. The memory 1720 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1730 may be any detachable or non-detachable medium and may include a machine-readable medium such as a memory, flash memory drive, magnetic disk or another other media, which can be used for storing information and/or data and can be accessed in the computing device 1700.

The computing device 1700 may further include additional detachable/non-detachable, volatile/non-volatile memory medium. Although not shown in FIG. 17, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1740 communicates with a further computing device via the communication medium. In addition, the functions of the components in the computing device 1700 can be implemented by a single computing cluster or multiple computing machines that can communicate via communication connections. Therefore, the computing device 1700 can operate in a networked environment using a logical connection with one or more other servers, networked personal computers (PCs) or further general network nodes.

The input device 1750 may be one or more of a variety of input devices, such as a mouse, keyboard, tracking ball, voice-input device, and the like. The output device 1760 may be one or more of a variety of output devices, such as a display, loudspeaker, printer, and the like. By means of the communication unit 1740, the computing device 1700 can further communicate with one or more external devices (not shown) such as the storage devices and display device, with one or more devices enabling the user to interact with the computing device 1700, or any devices (such as a network card, a modem and the like) enabling the computing device 1700 to communicate with one or more other computing devices, if required. Such communication can be performed via input/output (I/O) interfaces (not shown).

In some embodiments, instead of being integrated in a single device, some or all components of the computing device 1700 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1700 may be used to implement video encoding/decoding in embodiments of the present disclosure. The memory 1720 may include one or more video coding modules 1725 having one or more program instructions. These modules are accessible and executable by the processing unit 1710 to perform the functionalities of the various embodiments described herein.

In the example embodiments of performing video encoding, the input device 1750 may receive video data as an input 1770 to be encoded. The video data may be processed, for example, by the video coding module 1725, to generate an encoded bitstream. The encoded bitstream may be provided via the output device 1760 as an output 1780.

In the example embodiments of performing video decoding, the input device 1750 may receive an encoded bitstream as the input 1770. The encoded bitstream may be processed, for example, by the video coding module 1725, to generate decoded video data. The decoded video data may be provided via the output device 1760 as the output 1780.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:
   determining, during a conversion between a target block in a target picture of a video and a bitstream of the video, first motion information of the target block based on a regular merge mode, the first motion information comprising a regular merge list of regular merge candidates for the target block;
   determining second motion information associated with a geometric partitioning-based merge mode from the first motion information, the second motion information comprising a geometric partitioning-based merge list of geometric partitioning-based merge candidates for the target block, wherein a redundancy check is applied for determining the geometric partitioning-based merge list; and
   performing the conversion based on the first motion information and the second motion information,
   wherein at least one history-based MVP (HMVP) table is maintained for proceeding a video block coded by the geometric partitioning-based merge mode.

2. The method of claim 1, wherein the geometric partitioning-based merge mode comprises one of a geometric partitioning mode (GPM), and wherein the determining comprises:
   if a first block of the video is coded by the GPM, determining third motion information for a first part of the first block and fourth motion information for a second part of the first block;
   generating a final prediction for the first block based on a weighted sum of prediction samples derived from the third motion information and the fourth motion information; and
   determining the second motion information based on the final prediction, or
   wherein the geometric partitioning-based merge mode comprises a geometric partitioning mode with motion vector differences (MVD), and wherein the determining comprises:
   if a second block of the video is coded by the geometric partitioning mode with motion vector differences, determining fifth motion information for a first part of the second block and sixth motion information for a second part of the second block;
   generating a first prediction for the second block based on a sum of prediction samples derived from the fifth motion information and the sixth motion information;
   generating a second prediction for the second block based on the first prediction and MVD information; and
   determining the second motion information based on the second prediction for the second block.

3. The method of claim 1, wherein determining the second motion information comprises at least one of the following:
   determining, based on a regular merge candidate associated with a first index, one of the geometric partitioning-based merge candidates associated with a second index, the first index being different from the second index, or reordering the geometric partitioning-based merge candidates in the geometric partitioning-based merge list based on a predefined rule, wherein the geometric partitioning-based merge candidates are reordered based on the predefined rule for sorting a template cost in ascending order, and wherein the template cost is determined based on a sum of sample difference between left and/or above neighboring reconstructed samples of the target block and the corresponding neighbors of a reference block.

4. The method of claim 1, wherein determining the second motion information based on the redundancy check comprises:

determining, based on a parity of a candidate index, a target geometric partitioning-based merge candidate from the regular merge list of regular merge candidates; and determining the second motion information by inserting the target geometric partitioning-based merge candidate into the geometric partitioning-based merge list or pruning the geometric partitioning-based merge list based on the redundancy check, wherein the pruning comprises one of a full pruning or a partial pruning; and wherein determining the second motion information by inserting the target geometric partitioning-based merge candidate into the geometric partitioning-based merge list or pruning the geometric partitioning-based merge list comprises:

if the target geometric partitioning-based merge candidate has similar motion data as at least one of MVD merge candidates in the geometric partitioning-based merge list, pruning the target geometric partitioning-based merge candidate into the geometric partitioning-based merge list, and if the target geometric partitioning-based merge candidate has different motion data as at least one of geometric partitioning-based merge candidates in the geometric partitioning-based merge list, inserting the geometric partitioning-based merge list.

5. The method of claim 1, wherein determining the second motion information by inserting the target geometric partitioning-based merge candidate into the geometric partitioning-based merge list or pruning the geometric partitioning-based merge list comprises:

determining a similarity between the target geometric partitioning-based merge candidate and at least one of geometric partitioning-based merge candidates in the geometric partitioning-based merge list;

if the similarity does not exceed a threshold, inserting the target geometric partitioning-based merge candidate into the geometric partitioning-based merge list; and if the similarity exceeds the threshold, pruning the geometric partitioning-based merge list, and wherein determining the similarity comprises one of the following:

determining the similarity between the target geometric partitioning-based merge candidate and all the geometric partitioning-based merge candidates in the geometric partitioning-based merge list, checking a difference between motion data of the target geometric partitioning-based merge candidate and motion data of at least one of geometric partitioning-based merge candidates in the geometric partitioning-based merge list, and the motion data comprises at least one of a prediction direction (L0, L1), motion vectors, a POC value, and at least one inter-prediction mode, determining the similarity is based on whether a difference between motion data of the target geometric partitioning-based merge candidate and motion data of at least one of geometric partitioning-based merge candidates in the geometric partitioning-based merge list is greater than or smaller than a threshold, or determining the similarity is based on whether motion data of the target geometric partitioning-based merge candidate and motion data of at least one of geometric partitioning-based merge candidates in the geometric partitioning-based merge list is identical.

6. The method of claim 1, wherein the geometric partitioning-based merge candidates comprise GMVD merge candidates representing motion information derived from GPM merge candidates associated with GMVD merge candidates plus selected MVDs.

7. The method of claim 1, wherein determining the second motion information comprises:

if the number of the geometric partitioning-based merge candidates in the geometric partitioning-based merge list does not exceed a threshold, generating at least one additional geometric partitioning-based merge candidate; and inserting the at least one additional geometric partitioning-based merge candidate into the geometric partitioning-based merge list, and wherein the method further comprises:

obtaining a syntax element indicative of the threshold, the syntax element comprising a value specifying a maximum number of geometric partitioning-based merge candidates in the geometric partitioning-based merge list or a maximum number of regular merge candidates, and wherein the at least one additional geometric partitioning-based merge candidate is generated based on the geometric partitioning-based merge candidates already existed in the geometric partitioning-based merge list, wherein generating the at least one additional geometric partitioning-based merge candidate comprises one of the following:

generating the at least one additional geometric partitioning-based merge candidate by averaging L0 motion of a first number of L0 predicted geometric partitioning-based merge candidates in the geometric partitioning-based merge list, the first number is predefined, or generating the at least one additional geometric partitioning-based merge candidate by averaging L1 motion of a second number of L1 predicted geometric partitioning-based merge candidates in the geometric partitioning-based merge list, the second number is predefined, and wherein generating the at least one additional geometric partitioning-based merge candidate comprises:

generating the at least one additional geometric partitioning-based merge candidate based on a history-based GPM merge candidate table, wherein the at least one additional geometric partitioning-based merge candidate comprises at least one uni-prediction GPM merge candidate, and wherein generating the at least one additional geometric partitioning-based merge candidate comprises:

generating the at least one uni-prediction GPM merge candidate based on one of the regular merge candidates and a position of the regular merge candidate in the regular merge candidate list, wherein generating the at least one uni-prediction GPM merge candidate comprise:

if a parity of the regular merge candidate is an odd number, extracting L0 motion data of the regular merge candidate for generating the at least one uni-prediction GPM merge candidate; and if the parity of the regular merge candidate is an even number, extracting L1 motion data of the regular merge candidate for generating the at least one uni-prediction GPM merge candidate, wherein the at least one additional geometric partitioning-based merge candidate comprises at least one uni-prediction zero motion vector comprising at least one of the following:

at least one L0 predicted zero motion vector, and at least one L1 predicted zero motion vector, wherein the number of the at least one uni-prediction zero motion vector is based on the number of active reference pictures in L0 or L1 direction, and wherein inserting the at least one additional geometric partitioning-based merge candidate into the geometric partitioning-based merge list comprises:

inserting the at least one zero motion vector with an increasing order of a reference index ranging from 0 to the number of the active reference pictures in L0 or L1 direction.

8. The method of claim 7, wherein inserting the at least one additional geometric partitioning-based merge candidate into the geometric partitioning-based merge list comprises:

inserting the at least one zero motion vector with an increasing order of a reference index ranging from 0 to the number of the active reference pictures in L0 or L1 direction, or wherein a maximum number of geometric partitioning-based merge candidates available in the geometric partitioning-based merge list is larger than a maximum number of regular merge candidates available in the regular merge candidate list.

9. The method of claim 1, wherein one of the geometric partitioning-based merge candidates for the target block is indexed with K, and a LX motion vector of the K-th regular merge candidate exists, where X is equal to 0 or 1 and corresponds to the parity of K, and the method further comprises:

determining motion information of the target block based on one of the LX motion vector or a L(1−X) motion vector of the K-th regular merge candidate.

10. The method of claim 9, wherein whether to use the LX motion vector or the L(1−X) motion vector for determining the motion information of the target block is based on at least one of the first motion information of the regular merge candidates in the regular merge list and the second motion information of the geometric partitioning-based merge candidates in the geometric partitioning-based merge list, wherein motion information of the L(1−X) motion vector is used for determining the motion information of the target block, if motion information of the LX motion vector is identical to motion information of at least one geometric partitioning-based merge candidate with an index smaller than K.

11. The method of claim 9, wherein the geometric partitioning-based merge list comprises a uni-prediction geometric partitioning-based merge list, and wherein whether to use L0 motion vector or L1 motion vector for determining the uni-prediction geometric partitioning-based merge list is based on an accumulated value of prediction directions from the geometric partitioning-based merge candidates already inserted in the uni-prediction geometric partitioning-based merge list, wherein the number of L0 predicted geometric partitioning-based merge candidates that precede a current geometric partitioning-based merge candidate to be inserted is X, and the number of L1 predicted geometric partitioning-based merge candidates that precede a current geometric partitioning-based merge candidate to be inserted is Y, and wherein if a difference between X and Y is not less than a threshold, the L1 motion vector is extracted from a bi-prediction regular merge candidate, and inserted into the uni-prediction geometric partitioning-based merge list as a geometric partitioning-based merge candidate, and wherein the L1 motion vector of a L1 predicted regular merge candidate is directly inserted into the uni-prediction geometric partitioning-based merge list as a geometric partitioning-based merge candidate, and wherein the method further comprises:

projecting a L0 predicted regular merge candidate to a prediction direction L1; and inserting the projected regular merge candidate into the uni-prediction geometric partitioning-based merge list as a geometric partitioning-based merge candidate, wherein if a difference between X and Y is not greater than the threshold, the L0 motion vector is extracted from the bi-prediction regular merge candidate, and inserted into the uni-prediction geometric partitioning-based merge list as a geometric, and wherein the L0 motion vector of a L0 predicted regular merge candidate is directly inserted into the uni-prediction geometric partitioning-based merge list as a geometric partitioning-based merge candidate, and wherein the method further comprises:

projecting a L1 predicted regular merge candidate to a prediction direction L0; and inserting the projected regular merge candidate into the uni-prediction geometric partitioning-based merge list as a geometric partitioning-based merge candidate.

12. The method of claim 1, wherein the regular merge candidates in the regular merge list comprise at least one bi-prediction regular merge candidate, and wherein determining the second motion information comprises:

generating two uni-prediction geometric partitioning-based merge candidates based on each of the at least one bi-prediction regular merge candidate; and adding the two uni-prediction geometric partitioning-based merge candidates for each bi-prediction regular merge candidate into the geometric partitioning-based merge list, wherein each of the at least one bi-prediction regular merge candidate comprises L0 motion vector and L1 motion vector, and wherein generating the two uni-prediction geometric partitioning-based merge candidates comprises:

forming a uni-prediction geometric partitioning-based merge candidate in the geometric partitioning-based merge list based on the L0 motion vector of the bi-prediction regular merge candidate; and forming another uni-prediction geometric partitioning-based merge candidate in the geometric partitioning-based merge list based on the L1 motion vector of the bi-prediction regular merge candidate.

13. The method of claim 1, wherein the geometric partitioning-based merge candidates in the geometric partitioning-based merge list comprise uni-prediction geometric partitioning-based merge candidates, or bi-prediction geometric partitioning-based merge candidates, wherein the method further comprises one of the following:

partitioning the target block into two parts based on the geometric partitioning-based merge mode;

coding, based on the geometric partitioning-based merge mode, one of the two parts of the target block from a uni-prediction; and coding, based on the geometric partitioning-based merge mode, the other one of the two parts of the target block from bi-prediction; or partitioning the target block into two parts based on the geometric partitioning-based merge mode; and coding, based on the geometric partitioning-based merge mode, the two parts of the target block from bi-prediction; or partitioning the target block into two parts based on the geometric partitioning-based merge mode; and coding, based on the geometric partitioning-based merge mode, the two parts of the target block from uni-prediction, wherein one of the two parts of the target block is coded from prediction direction L0, and the other one of the two parts of the target block is coded from prediction direction L1.

14. The method of claim 1, wherein determining the second motion information comprises:

determining regular merge mode with motion vector differences (MMVD) based motion vectors of the regular merge candidates based on regular MMVD mode and MVD information; and determining the geometric partitioning-based merge candidates based on the regular MMVD based motion vectors, wherein determining the geometric partitioning-based merge candidates comprises one of the following:

inserting L0 motion vector or L1 motion vector of one of the regular MMVD based motion vectors into the geometric partitioning-based merge list, or inserting both L0 motion vector and L1 motion vector of one of the regular MMVD based motion vectors into the geometric partitioning-based merge list, and wherein the method further comprises:

obtaining at least one geometric partitioning-based merge mode related syntax element indicative of the regular MMVD mode to be used for the target block, or wherein determining the second motion information comprises:

reordering the geometric partitioning-based merge candidates in the geometric partitioning-based merge list based on a predefined rule, wherein the geometric partitioning-based merge candidates are reordered based on the predefined rule for sorting a template cost in ascending order, and wherein the template cost is determined based on a sum of sample difference between left and/or above neighboring reconstructed samples of the target block and the corresponding neighbors of a reference block.

15. The method of claim 1, wherein the geometric partitioning-based merge candidates in the geometric partitioning-based merge list comprises merge candidates coded by a geometric partitioning mode with motion vector differences, and wherein determining the second motion information comprises:

determining the second motion information by inserting a target merge candidate coded by the geometric partitioning mode with motion vector differences into the geometric partitioning-based merge list, if the target merge candidate does not have the same or similar motion information as at least one of candidates already existed in the geometric partitioning-based merge list; and determining the second motion information by pruning the geometric partitioning-based merge list, if the target merge candidate does not have the same or similar motion information as at least one of the merge candidates already existed in the geometric partitioning-based merge list, wherein the pruning comprises one of a full pruning or a partial pruning, wherein determining the second motion information by pruning the geometric partitioning-based merge list comprises one of the following:

determining the target merge candidate from a final MV reconstructed based on a base MV and a MV difference;

determining whether motion information of the target merge candidate is the same or similar as motion information of a candidate already existed in the geometric partitioning-based merge list; and if the motion information of the target merge candidate is the same or similar as the motion information of the candidate already existed in the geometric partitioning-based merge list, pruning the geometric partitioning-based merge list by not inserting the target merge candidate into the geometric partitioning-based merge list; or determining a first merge candidate from a final MV reconstructed based on a base MV and a MV difference;

determining whether motion information of the first merge candidate is the same or similar as motion information of a second merge candidate already existed in the geometric partitioning-based merge list;

if the motion information of the first merge candidate is the same or similar as the motion information of the second merge candidate, modifying the first merge candidate to the target merge candidate, wherein modifying the first merge candidate comprises adding the final MV by a shifting value, or wherein the first merge candidate is modified more than once, until the motion information of the first merge candidate is not the same or similar to the motion information of the second merge candidate; and inserting the target merge candidate into the geometric partitioning-based merge list, wherein the method further comprises:

performing a redundancy check on the merge candidates already existed in the geometric partitioning-based merge list, and wherein whether the target merge candidate has the same or similar motion information from at least one of the merge candidates already existed in the geometric partitioning-based merge list is based on the redundancy check.

16. The method of claim 15, wherein determining the second motion information by inserting the target merge candidate into the geometric partitioning-based merge list or pruning the geometric partitioning-based merge list comprises:

determining a similarity between the target merge candidate and at least one of the merge candidates already existed in the geometric partitioning-based merge list;

if the similarity does not exceed a threshold, inserting the target merge candidate into the geometric partitioning-based merge list; and if the similarity exceeds the threshold, pruning the geometric partitioning-based merge list by not inserting the target merge candidate into the geometric partitioning-based merge list, wherein determining the similarity comprises one of the following:

determining the similarity between the target merge candidate and all the merge candidates existed in the geometric partitioning-based merge list, or, determining the similarity between the target merge candidate and at least one GMVD merge candidate in at least one predefined position in the geometric partitioning-based merge, wherein determining the similarity comprises:

checking a difference between motion data of the target merge candidate and motion data of at least one of merge candidates in the geometric partitioning-based merge list, and the motion data comprises at least one of a prediction direction (L0, L1), motion vectors, a POC value, and at least one inter-prediction mode, or determining the similarity is based on one of the following:

whether a difference between motion data of the target merge candidate and motion data of at least one of merge candidates already existed in the geometric partitioning-based merge list is greater than or smaller than a threshold, or, whether motion data of the target merge candidate and motion data of at least one of merge candidates already existed in the geometric partitioning-based merge list is identical.

17. The method of claim 1, wherein the second motion information is further determined based on motion information of a non-adjacent spatial block in the target picture.

18. The method of claim 1, wherein the conversion comprises at least one of decoding the target block from the bitstream of the video, or the conversion comprises encoding the target block into the bitstream of the video.

19. An apparatus for processing video data, comprising:

a processor; and a non-transitory memory coupled to the processor and having instructions stored thereon, wherein the instructions upon execution by the processor, cause the processor to perform a method comprising:

determining, during a conversion between a target block in a target picture of a video and a bitstream of the video, first motion information of the target block based on a regular merge mode, the first motion information comprising a regular merge list of regular merge candidates for the target block;

determining second motion information associated with a geometric partitioning-based merge mode from the first motion information, the second motion information comprising a geometric partitioning-based merge list of geometric partitioning-based merge candidates for the target block, wherein a redundancy check is applied for determining the geometric partitioning-based merge list; and performing the conversion based on the first motion information and the second motion information, wherein at least one history-based MVP (HMVP) table is maintained for proceeding a video block coded by the geometric partitioning-based merge mode.

20. A non-transitory computer-readable storage medium storing instructions that cause a processor to perform a method comprising:

determining, during a conversion between a target block in a target picture of a video and a bitstream of the video, first motion information of the target block based on a regular merge mode, the first motion information comprising a regular merge list of regular merge candidates for the target block;

determining second motion information associated with a geometric partitioning-based merge mode from the first motion information, the second motion information comprising a geometric partitioning-based merge list of geometric partitioning-based merge candidates for the target block, wherein a redundancy check is applied for determining the geometric partitioning-based merge list; and performing the conversion based on the first motion information and the second motion information, wherein at least one history-based MVP (HMVP) table is maintained for proceeding a video block coded by the geometric partitioning-based merge mode.

21. The method of claim 1, further comprising:

storing the bitstream in a non-transitory computer-readable recording medium.

* * * * *